US012718330B2

(12) United States Patent
Bouhnik

(10) Patent No.: US 12,718,330 B2
(45) Date of Patent: Aug. 25, 2026

(54) DEEP LEARNING TOF MODELS FOR CHERENKOV BASED PET/CT

(71) Applicant: GE Precision Healthcare LLC, Waukesha, WI (US)

(72) Inventor: Jean-Paul Bouhnik, Haifa (IL)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 253 days.

(21) Appl. No.: 18/592,186

(22) Filed: Feb. 29, 2024

(65) Prior Publication Data

US 2025/0278818 A1 Sep. 4, 2025

(51) Int. Cl.
*G06T 5/60* (2024.01)

(52) U.S. Cl.
CPC ...... *G06T 5/60* (2024.01); *G06T 2207/10104* (2013.01); *G06T 2207/20084* (2013.01)

(58) Field of Classification Search
CPC ..... A61B 6/037; A61B 6/5205; A61B 6/5258; A61B 6/54; A61B 5/0013; A61B 5/0033; A61B 6/5217; G06T 11/005; G06T 11/003; G06T 2207/10104; G06T 7/0012; G06T 2210/41; G06T 15/08; G06T 17/00; G06T 11/008; G06T 2207/10072; G06T 2207/30004; G06T 2207/30168; G06T 5/60; G06T 2207/20084; G06V 10/82; G06N 3/0464; G06N 3/08
See application file for complete search history.

(56) References Cited

U.S. PATENT DOCUMENTS

| | | | | |
|---|---|---|---|---|
| 10,977,841 B2 * | 4/2021 | Zhu | ........................ | G06T 7/0012 |
| 2022/0343496 A1 * | 10/2022 | Zhang | .................. | G06V 30/194 |
| 2022/0343566 A1 * | 10/2022 | Peng | ..................... | G06T 11/006 |

OTHER PUBLICATIONS

Li, Siqi, and Guobao Wang. "Deep kernel representation for image reconstruction in PET." IEEE transactions on medical imaging 41.11 (2022): 3029-3038. (Year: 2022).*
Mehranian, A. et al., "Deep learning-based time-of-flight (ToF) image enhancement of non-ToF PET scans," European Journal of Nuclear Medicine and Molecular Imaging, vol. 49, No. 11, Sep. 2022, Available Online May 4, 2022, 10 pages.

* cited by examiner

*Primary Examiner* — Courtney Joan Nelson
(74) *Attorney, Agent, or Firm* — McCoy Russell LLP

(57) ABSTRACT

The current disclosure provides systems and methods for increasing a quality of positron emission tomography (PET) images generated by a PET system with detectors including bismuth germinate (BGO) crystals. In one example, a method for the PET system comprises extracting a higher-quality 2-D image from a first image volume reconstructed using higher-quality time-of-flight (TOF) data acquired from a subject during a scan performed using the PET system, the TOF data based on Cherenkov radiation detected at the BGO crystals; extracting a lower-quality 2-D image from a second image volume reconstructed using lower-quality TOF data acquired from the subject by the PET system; generating an enhanced-quality 2-D image from the lower-quality 2-D image using a trained image quality enhancement model; merging the enhanced-quality 2-D image with the higher-quality 2-D image; and displaying the merged 2-D image on a display device of the PET system.

19 Claims, 11 Drawing Sheets

DEEP LEARNING TOF MODELS FOR CHERENKOV BASED PET/CT

TECHNICAL FIELD

Embodiments of the subject matter disclosed herein relate to positron emission tomography (PET) imaging, and more particularly, to systems and methods for improving the quality of PET images.

BACKGROUND

Modern positron emission tomography (PET) systems may incorporate time-of-flight (TOF) data into a reconstruction algorithm to increase a quality of reconstructed images. The TOF data includes measured time differences between detections of different photons detected for a pair of coincident annihilation events and translates it to estimated range of distance of the annihilation events from detector elements. In some cases, that range of distance can be used for compensating the attenuation of the photons by anatomical structures of a subject of a scan, based for example on attenuation map obtained from a CT scan of the patient or obtained by other means. The time differences, and the estimated range of distance, may be used to more precisely determine a location of the annihilation events along a Line of Response (LOR) during reconstruction of 3-D image from the acquired data. By more precisely determining the location of the annihilation events, a location and/or an extent of malignant tumor cells in the subject may be more accurately determined. Additionally, the TOF data may increase image quality of a PET system such that lower-dose, lower-activity scans may be performed, such as with immunotherapy. Additionally, similar image quality may be achieved with shorter acquisition time.

However, to achieve the advantages of TOF, a TOF PET system may rely on expensive scintillator crystals with high fluorescence strength and stopping power and short fluorescence time, such as lutetium oxyorthoscilicate (Ce) (LSO) scintillator crystals, rather than bismuth germinate (BGO) crystals typical of many PET scanners. Using LSO crystals rather than BGO crystals increases a cost of the PET system. Additionally, using LSO crystals may result in less design flexibility and may necessitate compromise between crystal thickness (which affects the sensitivity) and cost.

For PET systems including BGO crystals, some TOF data may be generated (with high TOF performance) by exploiting Cherenkov luminescence in the BGO crystals. However, a quality of the TOF data may be lower than desired for some of the events, resulting in lower-quality reconstructed images based on the lower TOF quality events.

SUMMARY

The current disclosure at least partially addresses one or more of the above identified issues by a method for imaging using a positron emission tomography (PET) system, the method comprising extracting at least one higher-quality 2-D image from at least one first patient image volume reconstructed using higher-quality time-of-flight (TOF) patient data acquired from a subject during a scan, the higher-quality TOF patient data based on Cherenkov radiation detected at bismuth germinate (BGO) crystals of the PET system; extracting at least one lower-quality 2-D image from a second patient image volume reconstructed using lower-quality TOF patient data acquired from the subject during the scan; generating at least one enhanced-quality 2-D image from the lower-quality 2-D image using a trained image quality enhancement model; merging the at least one enhanced-quality 2-D image with the higher-quality 2-D image to generate at least one merged 2-D image; and displaying the at least one merged 2-D image on a display device.

The above advantages and other advantages and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1A:
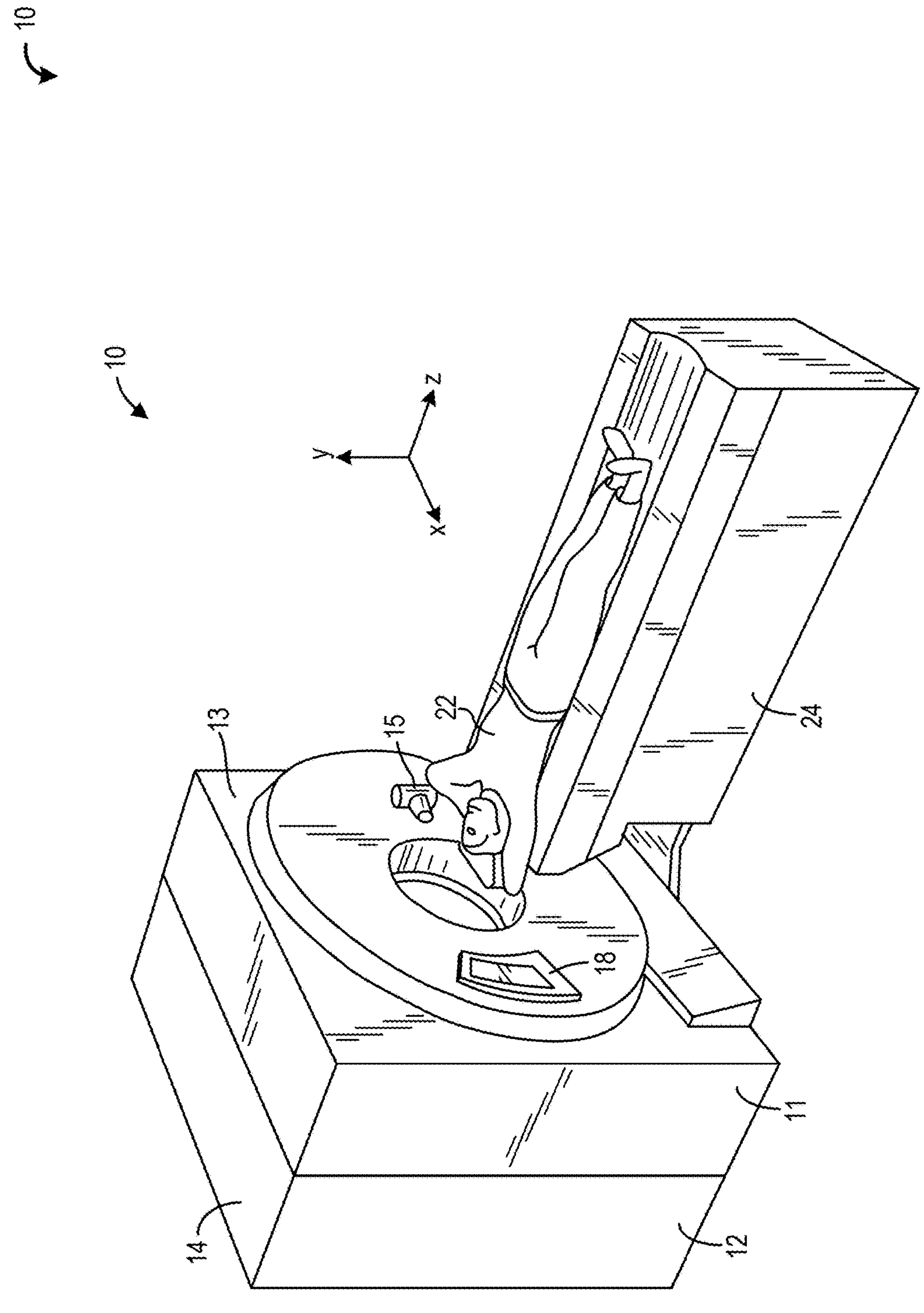
FIG. 1A is a pictorial view of an exemplary multi-modality imaging system according to one or more embodiments of the disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems, and methods.

In discussion of the various figures described herein below, like numbers refer to like parts. Specifically, a numeral followed by a letter such as "a" or "b" may mark symmetrical, similar, or identical elements. So as to not clutter the drawing and/or the text, a numeral followed by the letter "x" will refer to any of the letters that follow that numeral in the drawing, for example 120*x* can stand for any of 120*a* and 120*b*, etc. So as to not clutter the drawing and the text, elements and functions of elements that were marked and explained in reference to a figure may be omitted and not repeated in the following figures and their corresponding text.

The present disclosed subject matter may be a computer-based system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any of the steps or blocks of the method can be split to be executed on several processors or several computers. In general, the terms server, CPU, processor or computer should be understood as optionally comprising one or a plurality of computing units which can optionally be located in different locations.

DETAILED DESCRIPTION

Systems and methods are disclosed for increasing an image quality of a medical image acquired and reconstructed using a medical imaging system such as positron emission tomography (PET) system. In PET imaging, a chemical compound (a radioactive tracer, radiopharmaceutical) is injected or otherwise introduced into a subject prior to performing a PET scan, where one or more atoms of the chemical compound have been replaced with a radioisotope. For example, the chemical compound may be glucose, or an analogous compound such as fluorodeoxyglucose.

The subject may be asked to wait for a period of time while the radioactive tracer is absorbed into and accumulates in tissues within a region of interest of the subject's body. For example, the region of interest may be a brain of the subject. The radioactive tracer may accumulate in higher concentrations around malignant tumor cells, due to the malignant tumor cells being more active than normal cells, thus consuming more glucose. The absorption time may depend on various factors, and may be as short as a few minutes or as long as 90 minutes or more. After a predetermined waiting period, the subject may be placed within a PET scanner.

The radioactive tracer includes a radionuclide that decays over time. As the radionuclide decays, positrons are emitted, which may collide with electrons after travelling a short distance (e.g., less than 1 mm, depending on the type of tissue and the energy of the positron). When a positron collides with an electron, the positron and the electrons are annihilated, producing two 511 keV photons travelling in opposite directions, referred to as gamma rays. The PET scanner includes arrays of detectors positioned around the subject that are capable of detecting the gamma rays. The PET scanner also includes coincidence circuitry that measures a timing of pulses generated when a gamma ray is registered at a detector. If two gamma rays are registered by different detectors within a threshold amount of time (named "coincidence window"), it may be inferred that the two gamma rays were likely to be produced by the same annihilated positron (e.g., a coincidence event). When a coincidence event occurs, a line of response (LOR) connecting the location on the first detector and the location on the second detector where the evets were detected may be determined. The location of the annihilation is at some position on the LOR. Because a plurality of annihilation events may occur in areas where the tracer has accumulated, each annihilation event having a different LOR, the location of the radiotracer accumulation may be estimated from a plurality of LORs, in a process known as reconstruction. However, when non-TOF reconstruction is used, a probability of an annihilation occurring at a given point along a corresponding LOR may be assumed to be uniform, along this LOR, increasing cross talk between the different areas within the reconstructed volume, which may result in an increased amount of noise in a reconstructed image.

It should be noted that tissue can attenuate and scatter gamma rays. If even one of the gamma rays resulting from an annihilation event is absorbed, or scattered by the tissue, or misses the detector, a coincidence pair cannot be detected. An unpaired detected photon may be called "a "single", and a plurality of unpaired detected photons may be referred to as "singles". Since the rate of singles is very high, two (or more) singles may randomly occur within the coincidence window and mistakenly assigned as a coincidence pair (named "random pair"). Random pairs contribute noise to the reconstructed image. Thus, decreasing the coincidence window decreases the number of randoms, thus increases the image quality.

Photons generated by the positron annihilation may also interact with human tissues in other ways. For example, Compton scatter may occur, where a photon may collide with an electron of the human tissues. When the photon collides with the electron, some of the energy of the photon may be transferred to the electron, and the photon may be deflected from its original direction to another direction. Thus, the location of the annihilation event may not be along the resulting LOR. An energy threshold may be used, where events with an energy above a threshold (for example 435 keV) are accepted, with gamma rays that do not preserve their initial emission direction being rejected.

Similarly to the absorption in tissue, a gamma photon may be absorbed by the crystal in the detector in a photoelectric absorption event, depositing all its energy. Most of this energy is transferred to a photoelectron which is ejected from an atom at high velocity.

Alternatively, the gamma photon may undergo a Compton scattering in the detector, resulting in a partial transfer of energy to an electron. The photon thus deposits less than its full energy at a detector of the PET system. Some of the energy is transferred to a Compton electron, and the rest escapes as a scattered photon having a lower energy than the original gamma. As a result of a partial deposition of the energy at the detector (e.g., rather than a full deposition), the accuracy of the estimation of the location of the interaction of the photon with the detector may decrease. This causes a decreased accuracy in estimating the LOR, which may cause a reduction of a quality of an image reconstructed by the PET system.

To increase a quality of reconstructed image, the PET system may use time-of-flight (TOF) data of the photons generated from the annihilation. In TOF PET, a time difference may be measured between a first detection of a first photon resulting from the annihilation and a second detection of a second photon resulting from the annihilation, where the first detection and the second detection occur at opposite ends of an LOR of the annihilation. The time difference may be used to more precisely determine a location of the annihilation. Using the TOF data may result in an increased signal-to-noise (SNR) ratio, increasing the quality of the reconstructed image. To be of use, the timing of the two detected photons needs to be measured with accuracy better than the length of the LOR divided by the speed of light "c".

However, achieving the advantages of TOF PET may rely on using expensive scintillator crystals with high fluorescence strength and stopping power, and fast fluorescence retime, such as lutetium oxyorthoscilicate (Ce) (LSO (Ce)) or lutetium yttrium oxyorthoscilicate (LYSO) scintillator crystals, rather than the BGO crystals typical of many PET scanners. As a result, using LSO or LYSO crystals may increase a financial and/or material cost of the PET system, in comparison to an alternative PET system relying on the less expensive BGO crystals.

As a result of recent improvements in enhanced near-ultraviolet high-density (NUV-HD) silicon photomultiplier (SiPM) technology and readout electronics, PET systems including BGO crystals may be configured to perform a version of TOF PET based on Cherenkov luminescence (also referred to herein as Cherenkov radiation) emitted during a gamma detection event. BGO scintillator crystals emit Cherenkov light as a result of gamma rays' interactions. Cherenkov light is produced when a charged particle travels through matter faster than the speed of light in the crystal, which is substantially lower than the speed of light ("c") in vacuum. Photoelectrons generated by the interaction of the detected gamma photon with the crystal, may emit Cherenkov light for approximately 1-20 ps.

When a high energy gamma ray (e.g., 511 keV photon from a positron annihilation) interacts with BGO, approximately 40% of them undergo full energy deposition via photo-electric absorption, and the rest (~60%) undergo Compton scattering resulting in partial energy deposition. Accordingly, ~16% (0.4*0.4) of the detected LORs are the results of two photoelectric events, one at each of the pair of detectors; ~36% (0.6*0.6) of the detected LORs are the results of two Compton events, one at each of the pair of detectors; and ~48% (0.4*0.6+0.4*0.6) of the detected LORs are the results of one photoelectric event and one Compton event, at the pair of detectors.

The resulting fast electrons may emit approximately 20 Cherenkov photons in a short period of time (e.g., 20 ps). A relatively small number of Cherenkov photons are produced per interaction in comparison to the fluorescence photons, though the Cherenkov photons may significantly increase the average number of detected photons in the first few hundred ps of the events. A time difference between detecting one or more Cherenkov photons generated from a detected event at the first detector of a LOR and one or more Cherenkov photons detected at the second detector of the LOR may be measured and used to estimate the location of the annihilation event along said ROI, as described above. Thus, by exploiting the Cherenkov luminescence, a type of TOF PET may be performed using PET systems including BGO crystals rather than the more expensive LSO crystals.

The TOF technology used to measure the time difference may rely on a configuration of an application-specific integrated circuit (ASIC) chip of a PET detector, which may receive signals from the SiPM in response to light received from the BGO crystals. To increase the quality of images reconstructed using BGO Cherenkov TOF data, the reconstructing processor may be configured to use different convolution algorithms (e.g., kernels) under different circumstances, where a selected convolution algorithm may be specific to a line of response (LOR) after an annihilation event. For example, a first kernel may be used for events with photo-electric full energy deposition in both of two crystals on opposite sides of the LOR (first set of LORs); a second kernel may be used for events with photo-electric full energy deposition in a first crystal of the two crystals, with a partial deposition in a second crystal of the two crystals (e.g., as a result of Compton scattering, second set of LORs); and a third kernel may be used for events with a partial deposition in both of the two crystals (third set of LORs). The first kernel may have a higher performance than the second and/or third kernels. However, the photo-electric full energy deposition in both of the two crystals may occur less frequently than partial energy depositions. As a result, the fewer events, the TOF reconstruction by the first kernel may have less than desired quality.

To address this problem, and to increase the quality of a reconstructed image based on less-than-desirable TOF data generated by exploiting Cherenkov luminescence, the inventors herein propose an ultra-high sensitivity system that combines a first set of real Cherenkov luminescence-based TOF data generated by the PET system with a second set of TOF data generated by a deep learning (DL) neural network model trained with the real Cherenkov luminescence real TOF data. The DL neural network model may be trained to generate higher-quality TOF data comparable to a full energy deposition and Cherenkov luminescence created at both detectors of a LOR, from lower-quality TOF data having a higher incidence of partial energy depositions at least at one of the two detectors. By combining the generated higher-quality TOF data with the lower-quality TOF data improved by DL, the ultra-high sensitivity system may reconstruct improved images with a higher quality (e.g., with a higher Signal to Noise Ratio (SNR)) than may be obtained using the lower-quality TOF data alone.

Figure 1B:
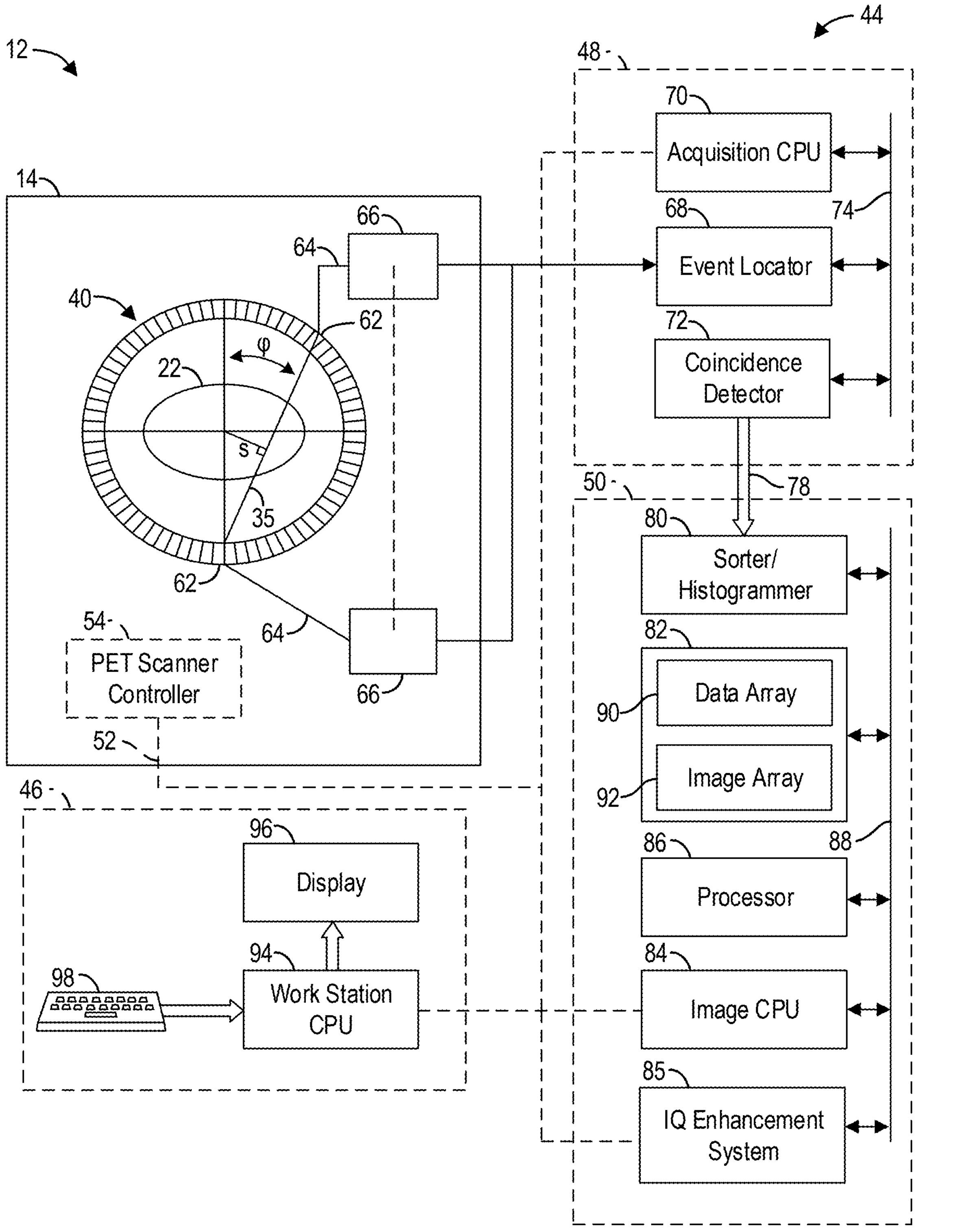
FIG. 1B is a block schematic diagram of a PET system which is a part of an exemplary multi-modality imaging system, according to one or more embodiments of the disclosure.
Figure 1C:
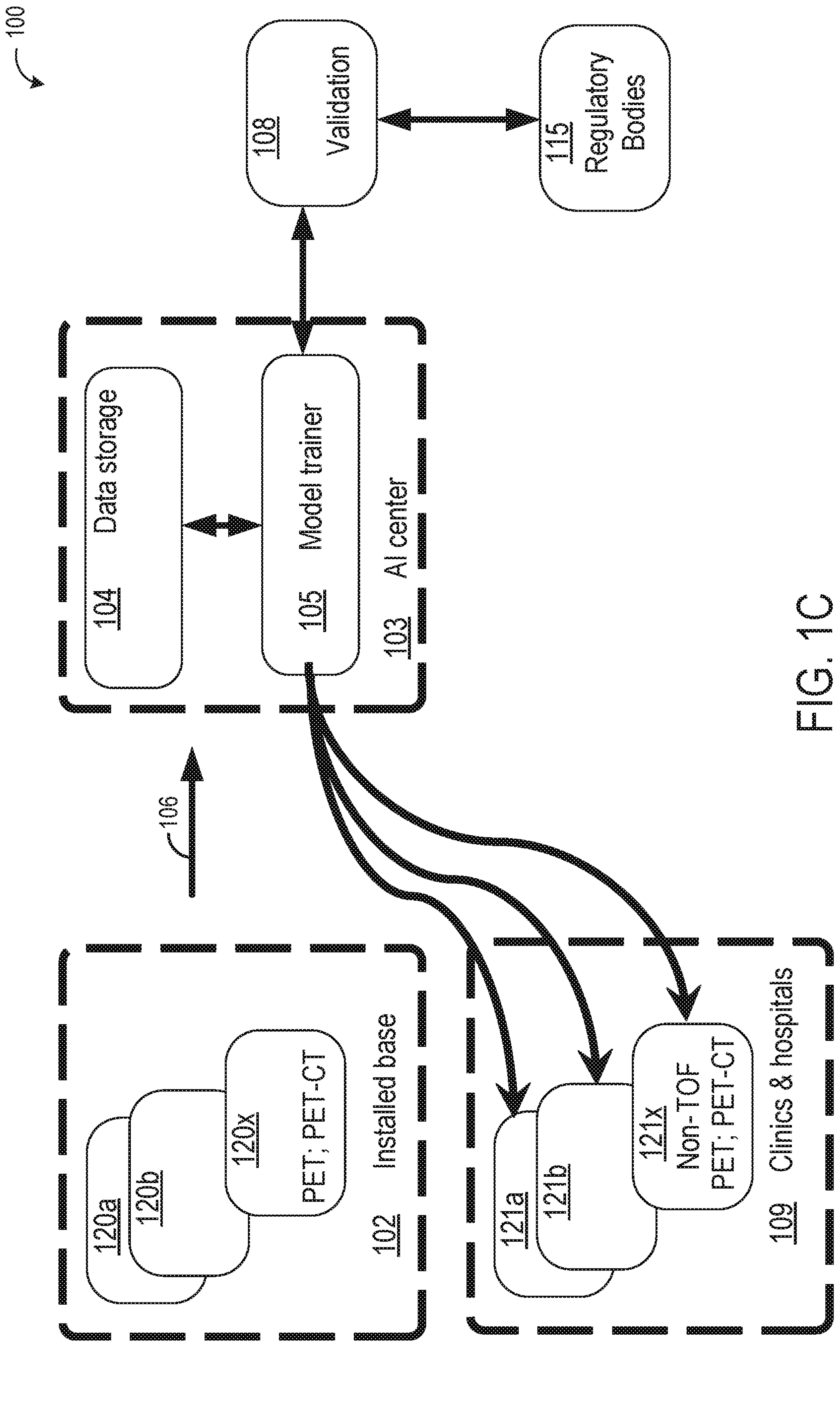
FIG. 1C. schematically shows a system for developing and using a deep learning TOF models for Cherenkov based PET and/or PET-CT according to some exemplary embodiments.
Figure 2:
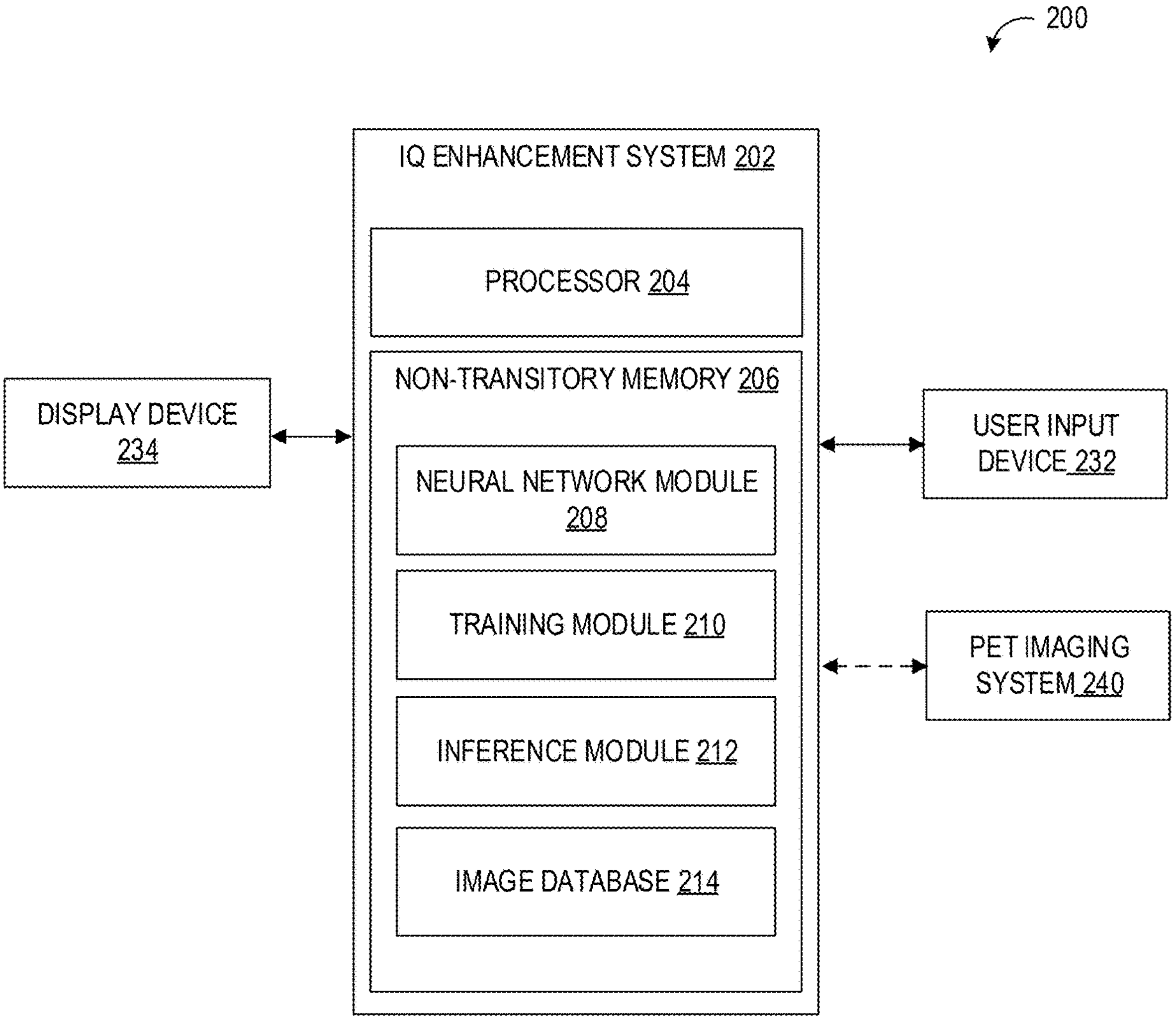
FIG. 2 shows a block diagram of an exemplary embodiment of a TOF PET image quality enhancement system for a PET imaging system, according to one or more embodiments of the disclosure.

A PET imaging system is shown in FIGS. 1A and 1B. The PET imaging system may be configured to increase a quality of an image reconstructed using the PET imaging system by incorporating TOF data, where the TOF data relies on Cherenkov luminescence generated in BGO crystals, as described in relation to FIG. 8. A system for developing and using a deep learning TOF models for Cherenkov based PET and/or PET-CT are shown in FIG. 1C. Incorporating the TOF data may include incorporating a second set of TOF data generated by a TOF PET image quality enhancement system based on the TOF data. An exemplary TOF PET image quality enhancement system is shown in FIG. 2. The TOF PET image quality enhancement system may be used to train a TOF PET image quality enhancement model to generate the second set of TOF data using an exemplary TOF PET image quality enhancement model training system shown in FIGS. 3 and 4. Training of the TOF PET image quality enhancement model may be carried out by following one or more steps of a method shown in FIG. 6. The TOF PET image quality enhancement model may be deployed at the PET imaging system as shown in FIG. 5, by following one or more steps of a method shown in FIG. 7. The TOF PET image quality enhancement model may be a convolutional neural network (CNN), with an exemplary architecture shown in FIG. 9.

It should be noted that other crystals, having slow scintillation and Cherenkov luminescence strong enough for sufficiently accurate timing determination may be used within the scope of the embodiments.

Various embodiments of the disclosure provide a multi-modality imaging system 10 as shown in FIGS. 1A and 1B (the block diagram of the PET modality is seen in FIG. 1B in order to reduce cluttering of the figure) Multi-modality imaging system 10 may be any type of imaging system with positron emission tomography (PET) capabilities.

Referring to FIG. 1A, the multi-modality imaging system 10 includes a first modality unit 11 and a second modality unit 12. The two modality units enable the multi-modality imaging system 10 to scan an object or patient in a second modality using the second modality unit 12. The multi-modality imaging system 10 allows for multiple scans in different modalities to facilitate an increased diagnostic capability over single-modality systems. In one embodiment, multi-modality imaging system 10 is a positron emission tomography-Computed Tomography (PET-CT) imaging system 10, e.g., the first modality 11 is a CT imaging system 11 and the second modality 12 is a PET imaging system 12. The PET-CT system 10 is shown as including a gantry 13 representative of a CT imaging system and a gantry 14 that is associated with a PET imaging system.

The rotating gantry 13 includes an x-ray source 15 that projects a beam of x-rays toward a detector array 18 on the opposite side of the gantry 13. Detector array 18 is formed by a plurality of detector rows (not shown) including a plurality of detector elements which together sense the projected x-rays that pass through a patient 22. Each detector element produces an electrical signal that represents the intensity of an impinging x-ray beam and hence allows estimation of the attenuation of the beam as it passes through the patient 22. During a scan to acquire x-ray data, gantry 13 and the components mounted thereon rotate about a center of rotation.

FIG. 1B is a block schematic diagram of the PET imaging system 12 illustrated in FIG. 1A, in accordance with an embodiment of the present disclosure. The PET imaging system 12 includes a plurality of detector ring assemblies 40, each including a plurality of detector crystals 62. The PET imaging system 12 also includes a processor 44, also referred to herein as a controller 44, to control normalization, image reconstruction processes and perform calibration. Controller 44 is coupled to an operator workstation 46. Controller 44 includes a data acquisition processor 48 and an image reconstruction processor 50, which are interconnected via a communication link 52. PET imaging system 12 acquires scan data and transmits the data to the data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table or bed 24 (shown in FIG. 1A). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system 12. The PET scanner controller 54 responds to the commands received from the operator workstation 46, or automatically generated by the workstation, through the communication link 52. Therefore, the scanning operation is controlled from the operator workstation 46 through PET scanner controller 54.

During operation, when a photon collides with a crystal 62 on a detector ring 40, it produces a scintillation event in the crystal. In some embodiments described herein, the crystal 62 is a BGO crystal. One or more photo-sensors are coupled to the crystals and produce a signal in response to the scintillation that may be transmitted on communication line 64. A set of acquisition circuits 66 is provided to receive these signals. Acquisition circuits 66 convert these signals to indicate the three-dimensional (3-D) location, timing, and total energy of the event. The signals are digitized when needed, and these digital signals are transmitted through a communication link, for example, a cable, to an event locator circuit 68 in the data acquisition processor 48.

The data acquisition processor 48 includes the event locator circuit 68, an acquisition CPU 70, and a coincidence detector circuit 72. The data acquisition processor 48 periodically samples the signals produced by the acquisition circuits 66. The acquisition CPU 70 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 that detected the event. An event data packet is communicated to the coincidence detector circuit 72 through the back-plane bus 74. The coincidence detector circuit 72 receives the event data packets from the event locator circuit 68 and determines if any two of the detected events are in coincidence. Valid coincidence pair is determined by a number of factors. First, the time markers in each event data packet may have to be within a predetermined time period, for example, 5.3 nanoseconds of each other. Second, the line-of-response (LOR) formed by a straight line joining the two detectors that detect the coincidence event should pass through the field of view in the PET imaging system 12. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 may optionally include a sorter/histogrammer 80. During operation, sorter/histogrammer 80 generates a data structure known as a histogram. A histogram includes a large number of cells, where each cell corresponds to a pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "sinogram". The term "histogrammer" generally refers to the components of the scanner, e.g., processor and memory, which carry out the function of creating the histogram. However, other reconstruction algorithms, and other data storage architectures may be used and may be used within the scope of this disclosure.

The image reconstruction processor 50 also includes a memory module 82, an image CPU 84, an array processor 86, and a communication bus 88. During operation, the sorter/histogrammer 80 counts all events occurring along each projection ray and organizes the events into 3-D data. This 3-D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 is also connected to the communication bus 88. The array processor 86 receives data array 90 as an input and reconstructs images in the form of image array 92. Resulting image arrays 92 are then stored in memory module 82.

In some embodiments, the image reconstruction processor 50 also includes an image quality enhancement system 85, which may process images reconstructed by the image reconstruction processor 50 to increase a quality of the images. An exemplary image quality enhancement system is described in greater detail below in reference to FIG. 2.

The images stored in the image array 92 are communicated by the image CPU 84 to the operator workstation 46. The operator workstation 46 includes a CPU 94, a display 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches and/or dials, the operator can control the operation of the PET imaging system 12 and the positioning of the patient 22 for a scan. Similarly, the operator can control the display of the resulting image on the display 96 and can perform image-enhancement functions using programs executed by the workstation CPU 94.

The detector ring assembly 40 includes a plurality of detector units. The detector unit may include a plurality of detectors, light guides, scintillation crystals and application specific integrated chips (ASICs), which may be analog, digital, or hybrid. For example, a detector unit may include twelve SiPM devices, optionally four light guides interfacing the 144 scintillation crystals with the SiPM devices, and two analog ASICs. It should be noted that other configurations of the detector units may be used within the scope of this disclosure.

FIG. 1C schematically shows a system 100 for developing and using a deep learning TOF models for Cherenkov based PET and/or PET-CT according to some exemplary embodiments. System 100 comprises an installed base 102 of a plurality of PET and PET-CT cameras, including cameras 120*a*, 120*b*, . . . 120*x*. Cameras 120*x* (also referred to as scanners 120*x*) can be of different types, at least some of them similar and identical to the type Cherenkov based PET and/or PET-CT for which the modes are developed for, which may be referred to as Cherenkov luminescence-based TOF PET cameras. Optionally, some of cameras 120*x* have true TOF capability named TOF PET cameras, having a fast scintillator and TOF circuitry to take advantage of the fast scintillator. Images acquired by cameras 120*x* may be transferred (as indicated by arrow 106) to an AI (Artificial Intelligence) center 103. The images may be stored in a data storage 104. The images that are stored in data storage 104 may be used for training at least two TOF models for Cherenkov-based PET and/or PET-CT at a model trainer 105. Several different model types may be developed and trained, for example, for different types of cameras or cameras' configurations, or for different clinical protocols.

Alternatively, data storage 104 may be used for storing raw or partially processed acquired data from each data acquisition session, for example as a "list file", which may list each detected coincidence pair. A listing of a detected coincidence pair may include in a non-limiting manner, information indicative of a corresponding location of the two detected events on the PET detector array; the two corresponding deposited energies; an absolute time of detection or a time since the start of the acquisition; a time difference between the two detected fluorescence signals; and if available, a time difference between the two detected Cherenkov illumination signals. In this case, model trainer 105 can be used to reconstruct images from the list files. Optionally, data storage 104 may be used for storing a mixed dataset comprising both list files and images.

The images that are stored in data storage 104 may include phantom images, for which a true radiopharmaceutical distribution is known. The images stored in data storage 104 may include high-quality images acquired using long acquisition times.

The TOF models for Cherenkov-based PET and/or PET-CT trained at model trainer 105 may undergo careful validation by a validation facility 108. Validation facility 108 is staffed by clinical and AI experts that provide feedback to the model trainer 105 based on the performance of the trained models.

Once the trained TOF models are developed, trained, and validated, the models may be presented to one or more regulatory bodies 115 (e.g., the FDA) to obtain any regulatory approvals to be used clinically in clinics or hospitals 109.

When the models are approved for clinical use, they may be transferred from the model trainer 105 to corresponding Cherenkov luminescence-based TOF PET cameras 121*x*, to be used clinically to enhance diagnostic images taken in clinics and hospitals 109. It should be noted that the Cherenkov luminescence-based TOF PET cameras 121*x* are equipped for exploiting Cherenkov luminescence, for example, as disclosed herein and/or in U.S. application Ser. No. 18/335,909, filed on 15 Jun. 2023 which is incorporated herein by reference. It should also be noted that at least some of the Cherenkov luminescence-based TOF PET cameras 121*x* may be parts of the installed base 102. The Cherenkov luminescence-based TOF PET cameras 121*x* may include non-TOF PET cameras.

It should also be noted that validation 108 of the trained model(s) may comprise installing said model(s) on at least some of the Cherenkov luminescence-based TOF PET cameras 121*x*, for example in universities, research facilities and hospitals, and using said Cherenkov luminescence-based approved model(s) without using the resulting enhanced images for diagnosing patients. For example, model-enhanced images may be compared to images reconstructed using algorithms of the prior art from the same acquired data, to judge improvements.

It should further be noted that the process seen in FIG. 1C may be iterative, such that experience, information, insight, and images obtained after distribution of the clinically approved model(s), may be used for further refining said model(s) at the model trainer 105. The refined models are then validated and distributed to at least some of the Cherenkov luminescence-based TOF PET cameras 121*x*.

It should be noted that during model training stage, image enhancement may be repeatedly performed by model trainer 105 on images stored in data storage 104, using a plurality of models and/or model parameters (also referred to as "weights"). Same or similar image enhancement may be performed, using an approved model and the corresponding approved model parameters on data acquired from a patient, during diagnostic imaging at a Cherenkov luminescence-based TOF PET or PET-CT camera 121*x*. Thus, redundant methods may not be repeated in the text and drawings.

Referring to FIG. 2, a block diagram 200 shows an example of an image quality enhancement system 202, in accordance with an exemplary embodiment. Image quality enhancement system 202 may process images reconstructed using a PET imaging system 240, which may be a non-limiting example of PET imaging systems 10 and 12 described above in reference to FIGS. 1A and 1B, respectively. More specifically, PET imaging system 240 may include a Cherenkov luminescence-based TOF PET or PET-CT 120*x* camera of FIG. 1C. In various embodiments, image quality enhancement system 202 is included in AI center 103 of FIG. 1C. For example, image quality enhancement system 202 may comprise or be included within model trainer 105.

In some embodiments, image quality enhancement system 202 may be incorporated into PET imaging system 240, as described above in reference to FIG. 1B. For example, image quality enhancement system 202 may rely on processor 86 and/or image CPU 84. In some embodiments, at least a portion of image quality enhancement system 202 is disposed at a device (e.g., workstation, edge device, server, etc.) communicably coupled to the PET imaging system via wired and/or wireless connections, which can receive images from the PET imaging system or from a storage device which stores the images/data generated by the PET imaging system. Image quality enhancement system 202 may also be operably/communicatively coupled to a user input device 232 and a display device 234. In some examples, user input device 232 may comprise the input device 98 of the PET imaging system 12, while display device 234 may comprise the display 96 of the PET imaging system 12.

Image quality enhancement system 202 includes a processor 204 configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration. In some embodiments, at least a portion of image quality enhancement system 202 is disposed at a remote processor such as hospital or clinic data processing center.

Non-transitory memory 206 may store a neural network module 208, a training module 210, an inference module 212, and an image database 214. Neural network module 208 may include at least one neural network model, such as one or more image quality enhancement models, and instructions for implementing the one or more image quality enhancement models to increase a quality of medical images, as described in greater detail below. In various embodiments, the one or more image quality enhancement models may be convolutional neural networks (CNNs), such as the CNN depicted in FIG. 9. Neural network module 208 may include trained neural networks and may further include various data, or metadata pertaining to the one or more neural networks stored therein.

Training module 210 may comprise instructions for training the one or more image quality enhancement models stored in neural network module 208 and/or other types of artificial intelligence (AI), machine learning, statistical, or other models. Training module 210 may include instructions that, when executed by processor 204, cause image quality enhancement system 202 to conduct one or more of the steps of method 600 for training an image quality enhancement model, described in greater detail below in reference to FIG. 6. In some embodiments, training module 210 may include instructions for implementing one or more gradient descent algorithms, applying one or more loss functions, and/or applying one or more training routines, for use in adjusting parameters of one or more neural networks of neural network module 208, as described in greater detail below. Training module 210 may include training datasets for the one or more image quality enhancement models of neural network module 208.

Inference module 212 may include instructions for deploying one or more trained image quality enhancement models, for example, to increase a quality of images generated during a scan using the PET system, as described below with respect to FIG. 7. The one or more trained image quality enhancement models may be deployed, for example, to the one or more Cherenkov luminescence-based TOF PET cameras 121*x* of FIG. 1C, where the one or more trained image quality enhancement models may be used during operation of the cameras 121*x*. Inference module 212 may include instructions that, when executed by processor 204, cause image quality enhancement system 202 to conduct one or more of the steps of method 700, described in further detail below.

Image database 214 may include PET images acquired via PET imaging system 240. Image database 214 may include two-dimensional (2-D) or three-dimensional (3-D) PET images, which may be used in one or more training sets for training the one or more image quality enhancement models of neural network module 208.

User input device 232 may comprise one or more of a touchscreen, a keyboard, a mouse, a trackpad, a microphone, a motion sensing camera, or other device configured to enable a user to interact with and manipulate data within image quality enhancement system 202. In one example, user input device 232 may enable a user to make a selection of an image to use in training a model, or for further processing using a trained model.

Display device 234 may include one or more display devices utilizing virtually any type of technology. In some embodiments, display device 234 may comprise a computer monitor, and may display 2-D PET images. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view images produced by an PET imaging system, and/or interact with various data stored in non-transitory memory 206.

It should be understood that image quality enhancement system 202 shown in FIG. 2 is for illustration, not for limitation. Another appropriate image quality enhancement system may include more, fewer, or different components.

Figure 3:
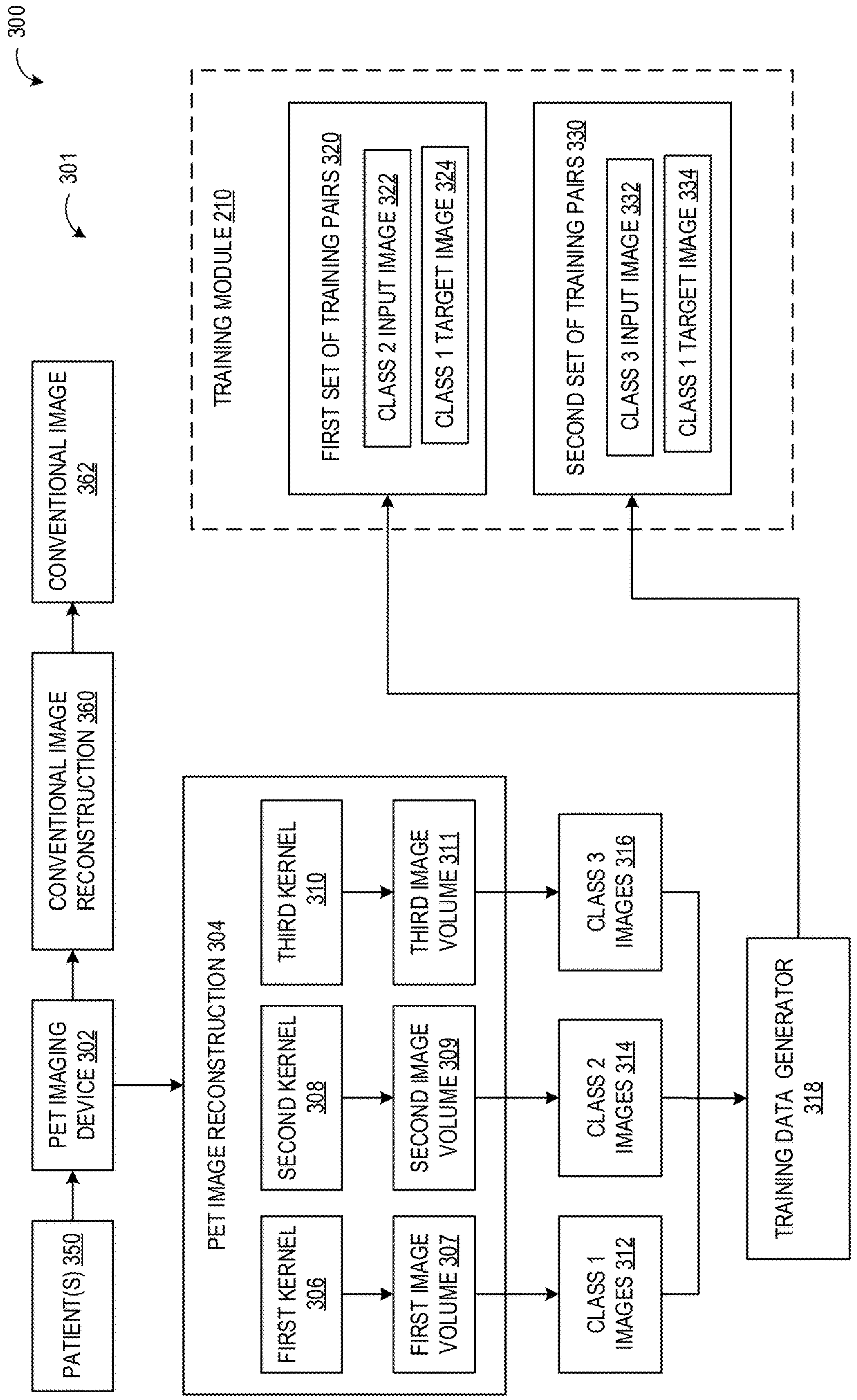
FIG. 3 shows a first block diagram of an exemplary TOF PET image quality enhancement model training system, according to one or more embodiments of the disclosure.

FIG. 3 shows a first portion 301 of a TOF PET image quality enhancement model training system 300, where first portion 301 describes a flow of data processing performed by an image quality enhancement system, such as image quality enhancement system 202 of FIG. 2, during generation of training sets for training at least two image quality enhancement models. The two image quality enhancement models may be used in conjunction, to increase a quality of medical images generated by a PET imaging system, such as the PET imaging systems 10 and 12 of FIGS. 1A and 1B, respectively.

In some embodiments, there may be a plurality of image quality enhancement model types, where each image quality enhancement model type may correspond to a different type of TOF PET or PET-CT camera (e.g., cameras 121*x* of FIG. 1C). For example, a first image quality enhancement model type may be generated for a Cherenkov luminescence-based TOF PET camera; a second image quality enhancement model type may be generated for a PET-CT camera; and so on. Additionally or alternatively, a plurality of image quality enhancement model types may be created, where each image quality enhancement models may correspond to a different clinical protocol. In other embodiments, two image quality enhancement model types may be created and used by various different camera types and/or clinical tasks. Each model type may comprise two image quality enhancement models, as described in greater detail below.

In first portion 301, a scan may be performed on one or more patients 350 using a PET imaging device 302, such as a scanner 120*x*. PET imaging device 302 may rely on detectors including BGO crystals, where limited TOF data may be acquired using the BGO crystals by exploiting Cherenkov radiation generated during annihilation events, as described below in reference to FIG. 8. Before the image quality enhancement models are clinically approved, patient diagnostics may be performed using a conventional image 362, which may be reconstructed using a conventional image reconstruction algorithm 360, as known in the art. First portion 301 may optionally be performed within a camera (e.g., scanner) 120*x* of FIG. 1C. Alternatively, first portion 301 may optionally be performed within AI center 103 using data transferred to the AI center 103 as a list file, a histogram or sinograms.

Figure 8:
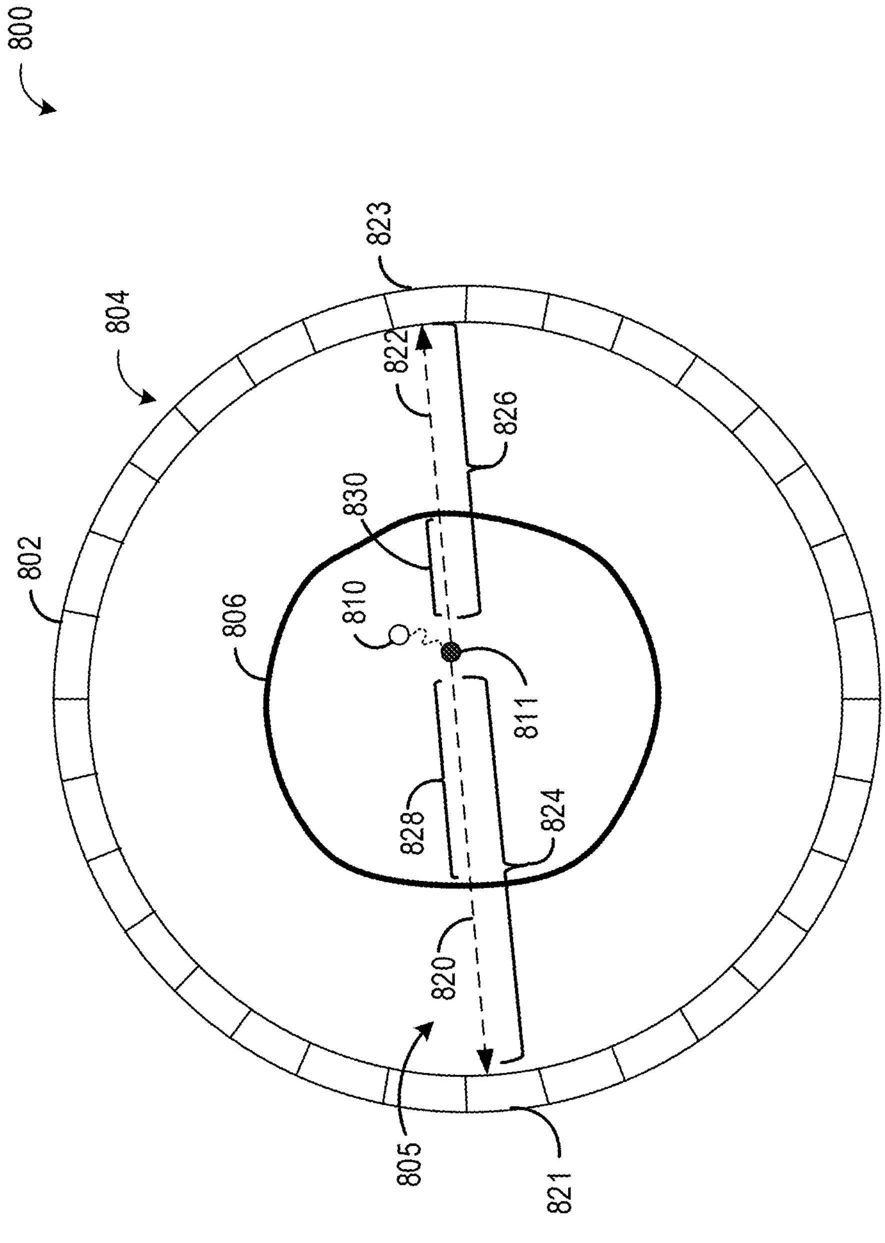
FIG. 8 is a diagram showing an exemplary annihilation event occurring in an anatomy of a subject of a PET scan, as prior art.

Turning briefly to FIG. 8, an exemplary coincidence event 800 is depicted, where coincidence event 800 occurs within an anatomical region 806 of a subject during a scan using a PET imaging device, such as PET imaging device 302 of FIG. 3. In one example, anatomical region 806 is a brain of the subject. During the scan, anatomical region 806 may be positioned within a gantry 804 (e.g., gantry 13 of FIG. 1B), where a plurality of detectors 802 are arranged around an inner circumference of gantry 804.

In coincidence event 800, a positron 810 is emitted by the radiopharmaceutical and travels in the tissue until it collides with an electron 811, causing both electron 811 and positron 810 to be annihilated. When the electron and positron 810 are annihilated, a first gamma ray and a second gamma ray are generated, where the first gamma ray and second gamma ray are 511 keV photons traveling in nearly opposite directions along an LOR 805 of the annihilation and coincidence event. The first gamma ray travels in a direction 820, and is detected at a first detector 821 of the plurality of detectors 802. The second gamma ray travels in an opposite direction 822, where opposite direction 822 is opposite to direction 820. The second gamma ray travelling in the opposite direction 822 is detected at a second detector 823 of the plurality of detectors 802. Thus, a line between detector 821 and detector 823 defines LOR 805.

A first distance 824 traveled by the first gamma ray prior to being detected at detector 821 may be greater than a second distance 826 traveled by the second gamma ray prior to being detected at detector 823. Additionally, the first gamma ray may be attenuated by tissues of anatomical region 806 over a first attenuation distance 828, and the second gamma ray may be attenuated by tissues of anatomical region 806 over a second attenuation distance 830. As a result of first distance 824 being greater than second distance 826, the first gamma ray may be detected at detector 823 at a first time, and the second gamma ray may be detected at detector 821 at a second time, where the second time may be later than the first time. The difference between the first time and the second time may be less than a threshold difference (e.g., 5 ns), whereby the PET imaging system may determine that the detection of the first gamma ray at detector 821 and the detection of the second gamma ray at detector 823 are coincident, meaning that the gamma rays both originated from the annihilation of positron 810. However, the difference between the first time and the second time (e.g., TOF data) may be used to determine an approximate position along the LOR of the annihilation of positron 810, wherein the accuracy of the approximate position is limited by the combined timing uncertainty of the difference between the first and second measured times. Statistically, the combined timing uncertainty of the difference between the first and second measured times may be estimated as the square root of the sum of the square of the uncertainty first measured tine and the uncertainty second measured tine. In embodiments where the plurality of detectors 802 are LOS crystals, the TOF data may be generated by the LOS crystals.

Additionally, when boundaries of anatomical region 806 are known, for example from a CT image of the patient, or from an initial reconstructed image which is segmented to tissue and air (and optionally clothing and table), the position along the LOR of the annihilation of positron 810 may be constrained to be within the boundaries of anatomical region 806. Optionally, if the position along the LOR of the annihilation of positron 810 is, with high probability, outside the boundaries of anatomical region 806, the LOR may be assigned as corresponding to a random photon pair and discarded.

In embodiments where the plurality of detectors 802 are BGO crystals, the gamma rays may not be detected with a precision that allows for generating the TOF data. However, a more limited set of TOF data may be generated from Cherenkov light emitted for a brief time after a gamma ray interacts with a BGO crystal. A first time at which the first emission of Cherenkov light is detected at detector 821 and a second time at which the second emission of Cherenkov light is detected at detector 823 may be measured precisely enough to generate the more limited set of TOF data, which may be used to increase a quality of a reconstructed image.

During the coincidence event, when the first fluorescence from a gamma ray and/or the first emission of Cherenkov light is detected at detector 821, a full amount of the energy included in the first gamma ray may be deposited at detector 821. Alternatively, a partial amount of the energy included in the first gamma ray may be deposited at detector 821, for example, due to Compton scattering of the first gamma ray and first emission of Cherenkov light. The second gamma ray behaves similarly when it is detected at detector 823. Thus, during a coincidence event, there are three alternative energy deposition scenarios: a first scenario with full energy deposition at both detectors 821 and 823; a second scenario with full energy deposition at one of detectors 821 and 823 and partial energy deposition at the other of detectors 821 and 823; and a third scenario with partial energy deposition at both detectors 821 and 823.

The TOF data may be of a highest quality with full energy deposition at both detectors 821 and 823. However, the probability of full energy deposition (PE, or Photo-Electric full energy deposition event) at a detector is 40%, with the probability of a partial energy deposition being 60%. As a result, the probability of full energy deposition at both detectors 821 and 823 in coincidence is 16%. The TOF data may be of a lower quality when there is full energy deposition at one of detectors 821 and 823, and partial energy deposition at the other of detectors 821 and 823. The probability of this occurring in coincidence is 48% (e.g., 24% for each combination). The TOF data may be of a lowest quality when there is partial energy deposition at both of detectors 821 and 823. The probability of this occurring in coincidence is 36%. Thus, the probabilities of the different scenarios may be summarized in table 1:

| (1) | | |
|---|---|---|
| | PE | COMPTON |
| PE | 16% | 24% |
| | 200 ps | 930 ps |
| COMPTON | 24% | 36% |
| | 930 ps | 1300 ps |

where PE is full photoelectric deposition. Additionally, an average timing uncertainty of each interaction is included, where TOF with full deposition is faster than TOF with partial deposition. The TOF uncertainty for event pair with full energy deposition at both detectors 821 and 823 is 200 ps; the TOF uncertainty for event pair with full energy deposition at one of detectors 821 and 823 and partial energy deposition at the other of detectors 821 and 823 is 930 ps; and the TOF uncertainty for event pair with partial energy deposition at both detectors 821 and 823 is 1300 ps.

Note that the values in table 1 were measured for a specific detector configuration, and may vary a with different detector configurations or with different detectors' construction (including changes in one or more of: the crystal material and shape, light-guide if present, SiPM performance, and the electronics). Specifically, the probabilities of detections of PE event vs. Compton events depends on the crystals' shapes, sizes, and relative positioning, as these factors controls the probability of Compton scattered gamma escaping the detector. Generally, some Compton scattered gamma photon may be captured in the same or nearby crystal, or escape the detector. Cherenkov luminescence may be generated by electrons having energy of more than 64 keV, however, due to the low number of generated light photons, detecting a Compton scattered gamma photon having less than 250 keV is difficult. Thus, in practice, the percentage of PE-PE may be more than 16%, and similarly, the percentage of PE-Compton may be more than 48%.

Additionally, the TOF uncertainty values in the table were estimated as the square root of the sum of squares of the uncertainties in timing the two events involved. The uncertainties in timing the two types of events depend on the crystal size and shape (which affects the light transfer), and the speed and accuracy of the SiPM and electronics.

Throughout the text and in the claims, the term "BGO Cherenkov-ready" PET camera and its equivalents can be viewed according to some embodiments as a PET camera having BGO crystals attached to fast SiPM detectors coupled to fast triggering circuits capable of providing accurate timing based on the rising edge of the electronic signal resulting from the light generated by a Gamma photon interacting with the crystal. The rising edge of the electronic signal resulting from the light generated by a Gamma photon comprises a slower rising component resulting from photons generated due to fluorescence in the BGO crystal, and a faster rising component resulting from the Cherenkov luminescence if present. It should be noted that the strength of the faster rising component resulting from the Cherenkov luminescence depends on the energy (and thus the speed) of the electron ejected in the interaction with the crystal, and only when the Cherenkov luminescence is strong enough it substantially affects the risetime of the signal. Timing accuracy increases with increasing risetime of the signal, hence the better timing resolution of detected PE events vs. Compton events.

In a "full energy deposition PE event", the 511 keV interacts with the crystal via a photoelectric interaction, resulting in fast moving electron causing strong Cherenkov luminescence and a strong fluorescence signal. The mean timing uncertainty is approximately 141.4 ps. Accordingly, the mean timing uncertainty of PE-PE event pair is 141.4*2^05=200 ps. A somewhat less energetic events may be a result of a "Glancing angle Compton scattering" (within the patient, or the crystal), where the Gamma photon loses small part of its energy, and then the Gamma photon undergoes a PE event in the crystal, resulting in a fast enough electron that produces "Cherenkov luminescence" which is strong enough to affect the timing resolution.

A "Partial energy deposition" event, is when the Gamma photon undergoes a "large angle Compton scattering" (CO) in the crystal, where the Gamma loses a large part of its energy. The resulting electron is not fast enough to produces "Cherenkov luminescence". The Compton scattered Gamma photon then undergoes a photoelectric absorption, that results in ejected electron having too low speed to generate Cherenkov luminescence, or low speed to generate weak Cherenkov luminescence that hardly affect the signal rise-time. In such CO events, the rising edge of the fluorescence signal (with or without the weak Cherenkov luminescence) yields a mean timing resolution of approximately 919.2 ps. Thus CO-CO event pair has timing resolution of approximately 119.2*2^05=1300 ps. Consequently, the timing resolution of PE-CO (and CO-PE) events pair is approximately (919.2^2+141.4^2)^0.5=930 ps.

Returning to FIG. 3, to generate a highest possible quality image, convolutional algorithms or kernels used to process the TOF data may be adjusted based on the energy deposition scenarios. In other words, a first kernel (e.g., first kernel 306 of FIG. 3) may be configured to for a first LOR with full energy deposition in both crystals; a second kernel (e.g., second kernel 308) may be configured for a second LOR with full energy deposition in a first crystal and partial energy deposition in a second crystal; and a third kernel (e.g., third kernel 310) may be configured for a third LOR with partial energy deposition in both crystals. For each LOR, one of the first kernel, the second kernel, or the third kernel may be selected for processing the TOF data by of the PET system, based on the energy deposition of the events in the LOR.

For example, the PET system may detect a first coincidence event and determine a first LOR with full energy deposition in both crystals, and may process TOF data of the first LOR using the first kernel 306. The PET system may detect a second coincidence event and determine a second LOR with full energy deposition in a first crystal and partial energy deposition in a second crystal, and may process TOF data of the second LOR using the second kernel 308. The PET system may detect a third coincidence event and determine a third LOR, also with full energy deposition in a first crystal and partial energy deposition in a second crystal, and may process TOF data of the third LOR using the second kernel 308. The PET system may detect a fourth coincidence event and determine a fourth LOR, with partial energy deposition in both crystals, and may process TOF data of the fourth LOR using the third kernel 310, and so on. By selecting an appropriate kernel for processing the TOF data based on the energy deposition scenario, an image quality of an image reconstructed using a combination of the first kernel 306, the second kernel 308, and the third kernel 310 may be higher than an image reconstructed using a single kernel.

It should be noted that when the acquired data is saved as a list file (as described in regard to FIG. 1C), different versions of at least one of the first, second and/or third kernels may be used again, on the same data, to create different corresponding images.

Thus, during a typical image reconstruction process, a different kernel of first kernel 306, second kernel 308, and third kernel 310 may be selected for each LOR detected by the PET imaging system. However, in accordance with the methods described herein, data acquired via PET imaging device 302 may also be used to reconstruct a plurality of images during a PET image reconstruction stage 304, where the different kernels 306, 308, and 310 may each be applied individually to generate different image volumes. Specifically, first kernel 306 may generate a first image volume 307, where first image volume 307 is reconstructed using data including a first set of LORs having full energy deposition at two opposing detectors of each LOR; second kernel 308 may generate a second image volume 309, where second image volume 309 is reconstructed using data including a second set of LORs having full energy deposition at a first detector and partial energy deposition at a second detector of each LOR; and third kernel 310 may generate a third image volume 311, where third image volume 311 is reconstructed using data including a third set of LORs having partial energy deposition at both detectors of each LOR. In this way, the data acquired from patient(s) 350 using PET imaging device 302 may be separated into three quality categories (e.g., highest-quality TOF data, lower-quality TOF data, and lowest-quality TOF data) based on the different LOR energy deposition scenarios, and a different image volume may be generated from each category of the three quality categories.

Thus, first image volume 307, second image volume 309, and third image volume 311 may each be reconstructed using a different, incomplete set of data. A first quality of first image volume 307 may be greater or different than a second quality of second image volume 309, due to using data including LORs with full energy deposition and no partial deposition. The second quality of second image volume 309 may be greater or different than a third quality of third image volume 311, due to using data including LORs with some full and some partial energy deposition. The third quality of third image volume 311 may be lower or different than both of the first quality and the second quality of first image volume 307 and second image volume 309, respectively, due to using data including LORs with partial energy deposition and not using data including LORs with full energy deposition.

In various embodiments, to increase the quality of all of first image volume 307, second image volume 309, and third image volume 311, the PET scan may be configured to acquire data from patient(s) 350 over a period of time that is longer than a typical PET scan, to increase in overall amount of data from which to generate the three distinct image volumes.

From the different image volumes generated during PET image reconstruction stage 304, different sets of 2-D images may be extracted, where the 2-D images are slices of a relevant image volume. A first class of images 312 may be extracted from first image volume 307; a second class of images 314 may be extracted from second image volume 309; and a third class of images 316 may be extracted from third image volume 311.

As described above, because a TOF performance is highest for coincidence events with photoelectric full energy deposition in both crystals, an image quality of the class 1 images 312 may be higher than an image quality of the class 2 images 314. Because the TOF performance for coincidence events with photoelectric full energy deposition in one crystal and partial energy deposition in the other crystal is higher than coincidence events with partial energy deposition in both crystals, and because of the larger number LORs with full energy deposition in one crystal and partial energy deposition in the other crystal, the image quality of the class 2 images 314 may be higher than an image quality of the class 3 images 316.

TOF PET image quality enhancement model training system 300 includes a training data generator 318, which may receive the class 1 images 312, class 2 images 314, and class 3 images 316, and assign them into a first set of training pairs 320 and a second set of training pairs 330. Each of the first set of training pairs 320 and the second set of training pairs 330 may include an input image and a target, ground truth image, where the input image and the target image correspond to a same location of a 2-D plane within different image volumes reconstructed using different kernels. Specifically, training pairs of the first set of training pairs 320 may each include an input image 322 selected from class 2 images 314, and a target image 324 selected from class 1 images 312, where input image 322 is a slice of second image volume 309 and target image 324 is a corresponding slice of first image volume 307. Training pairs of the second set of training pairs 330 may each include an input image 332 selected from class 3 images 316, and a target image 334 selected from class 1 images 312, where input image 332 is a slice of third image volume 311 and target image 334 is a corresponding slice of first image volume 307.

As was mentioned above, the PET image reconstruction 304 may be performed within the PET imaging device 302 prior to transferring the training images to the training module 210 (AI center 103 of FIG. 1C), or can be performed within the AI center 103 from a corresponding list file.

It should be noticed that the terms "2-D" images and "slices" may comprise any 2-D representation of a plane derived from a 3-D reconstructed image, for example: transverse, coronal, sagittal, or oblique planes.

Figure 4:
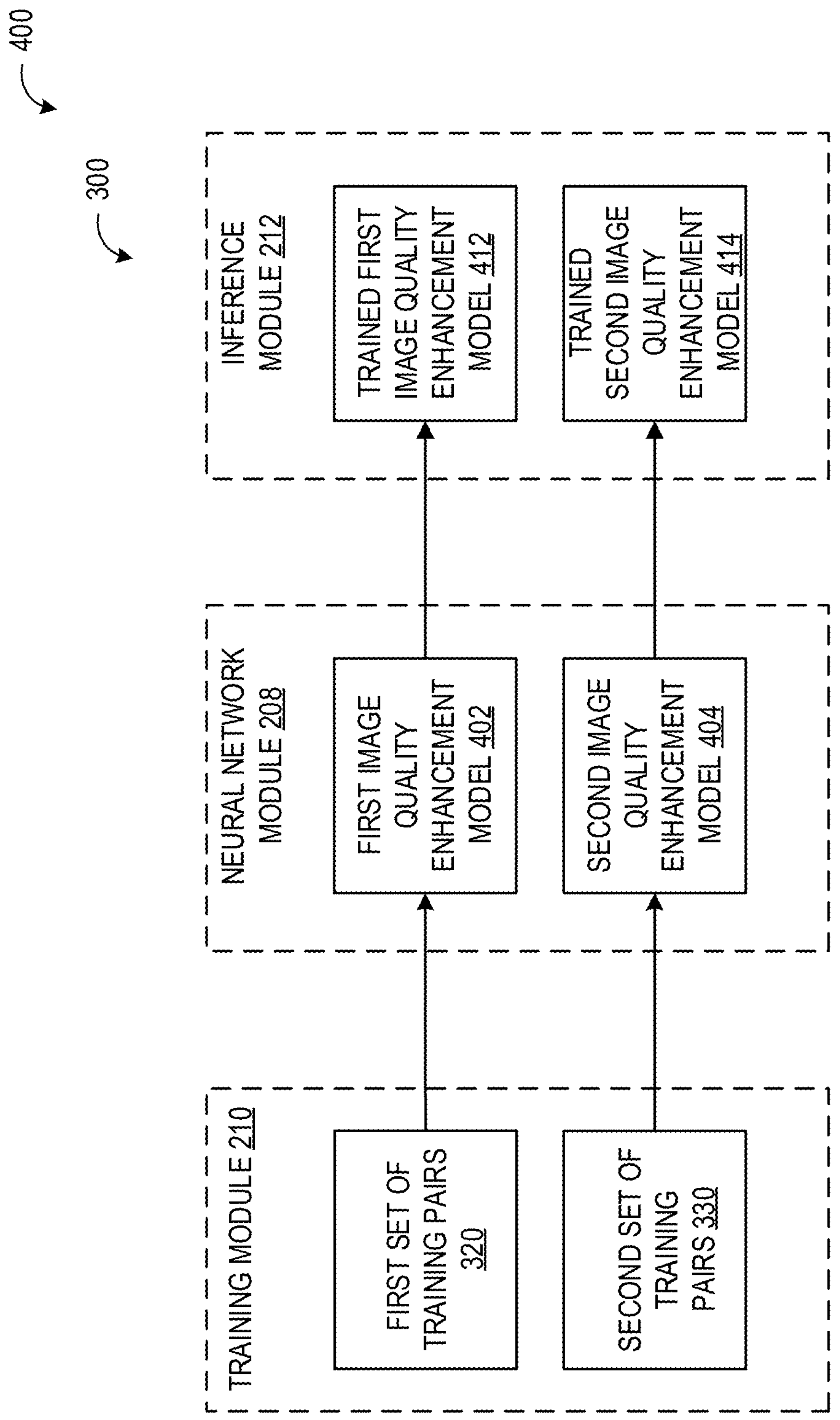
FIG. 4 shows a second block diagram of the TOF PET image quality enhancement model training system, according to one or more embodiments of the disclosure.
Figure 5:
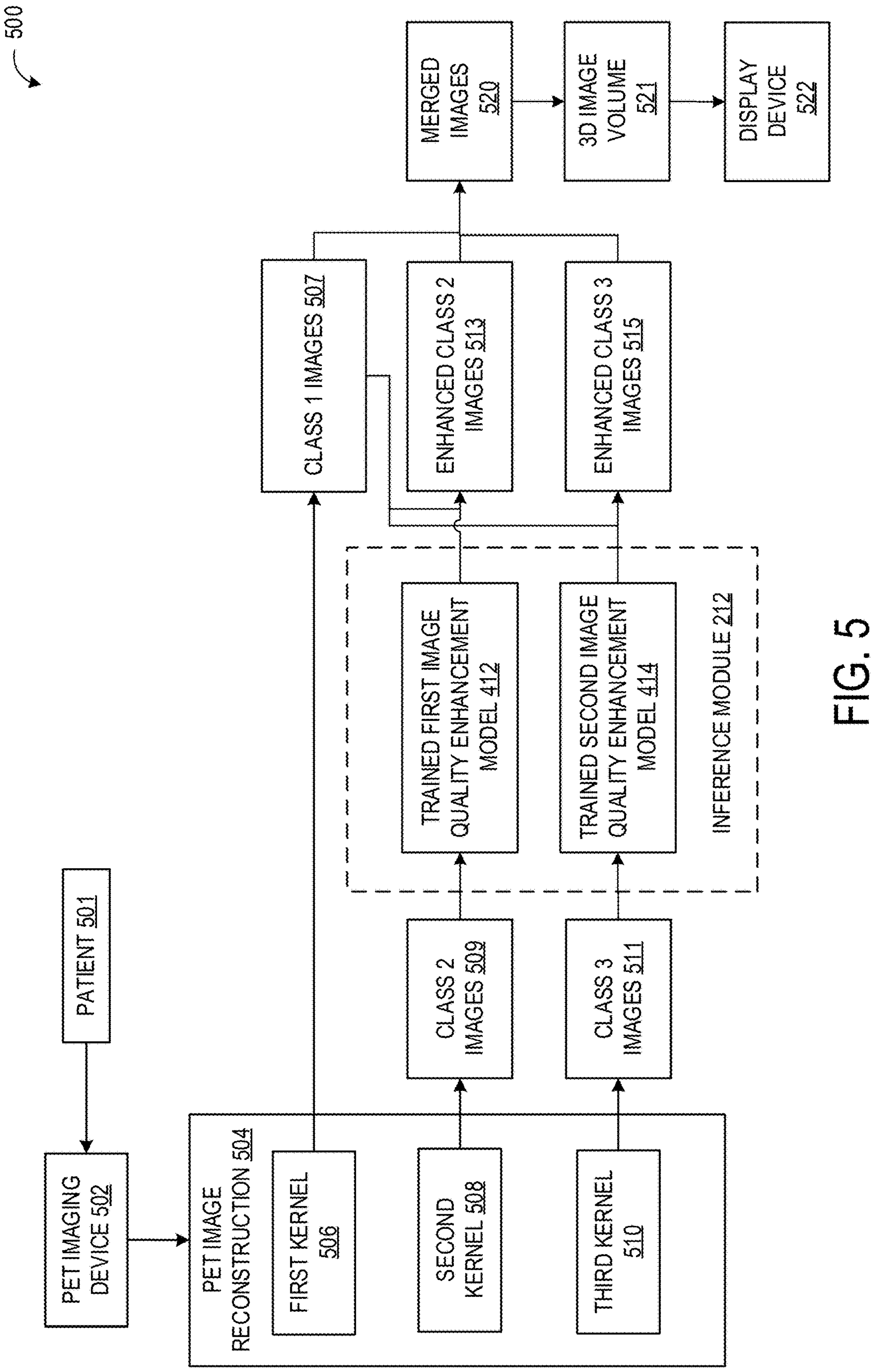
FIG. 5 shows a block diagram of an exemplary system for deploying an image quality enhancement model trained using the TOF PET image quality enhancement model training system of FIGS. 3 and 4, according to one or more embodiments of the disclosure.

Turning now to FIG. 4, a second portion 400 of TOF PET image quality enhancement model training system 300 is shown. Second portion 400 describes a flow of data processing performed by the image quality enhancement system during training of a first image quality enhancement model 402 and a second image quality enhancement model 404. First image quality enhancement model 402 may be trained on the first set of training pairs 320 described above in reference to FIG. 3, and second image quality enhancement model 404 may be trained on the second set of training pairs 330 of FIG. 3. Specifically, first set of training pairs 320 may be inputted into first image quality enhancement model 402 during training to generate a trained first image quality enhancement model 412, and second set of training pairs 330 may be inputted into second image quality enhancement model 404 to generate a trained second image quality enhancement model 414.

First set of training pairs 320 and second set of training pairs 330 may be stored in a training module of the image quality enhancement system, such as training module 210 of FIG. 2. First image quality enhancement model 402 and second image quality enhancement model 404 may be stored in a neural network module of the image quality enhancement system, such as neural network module 208 of FIG. 2. Trained first image quality enhancement model 412 and trained second image quality enhancement model 414 may be stored in an inference module of the image quality enhancement system, such as inference module 212 of FIG. 2. Training of the first image quality enhancement model 402 and the second image quality enhancement model 404 is described in greater detail below, in reference to FIG. 6.

Figure 6:
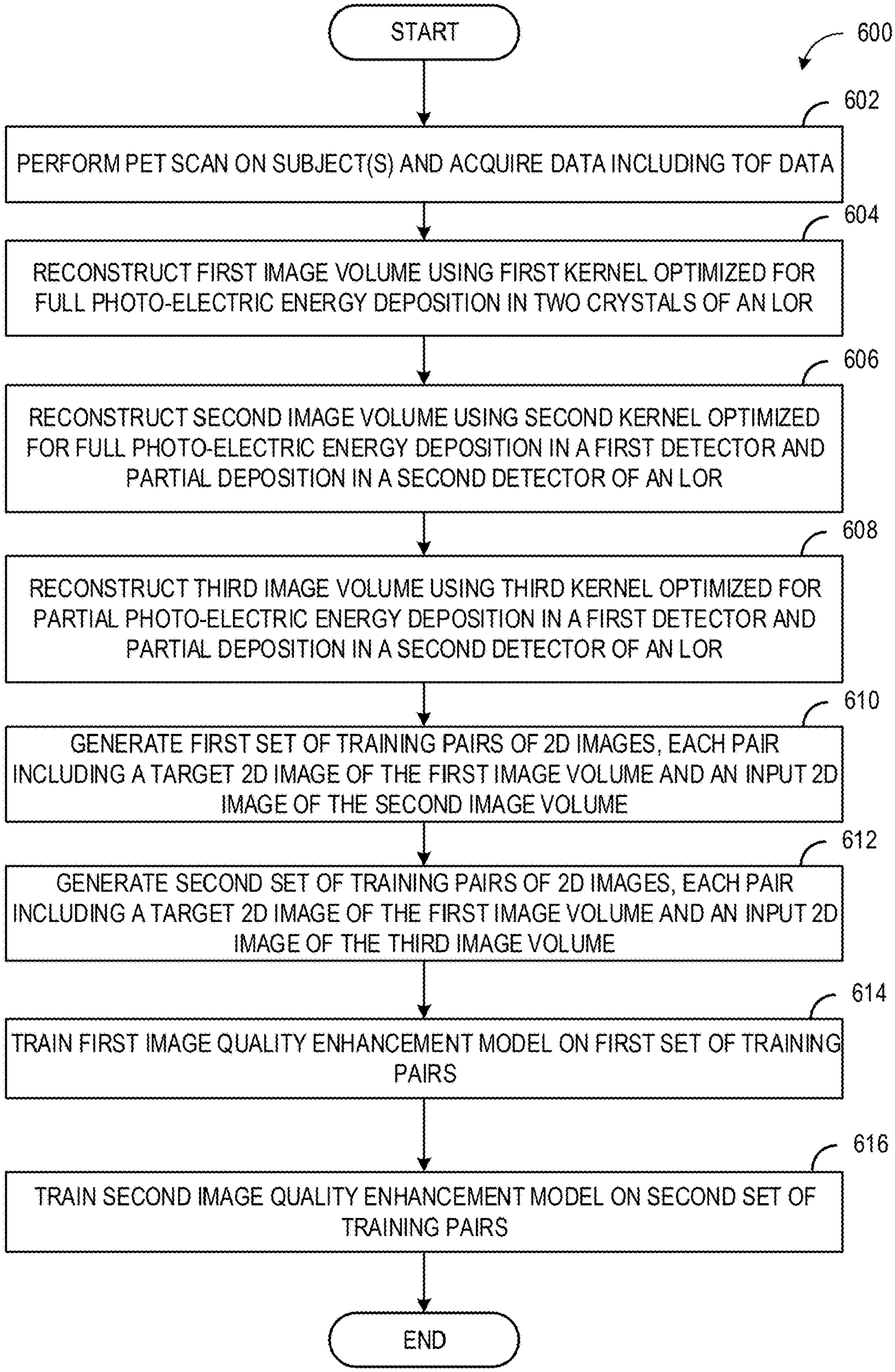
FIG. 6 is a flowchart illustrating an exemplary method for training a TOF PET image quality enhancement model, according to one or more embodiments of the disclosure.

In some embodiments, a single quality enhancement network may be trained on both of the first set of training pairs 320 and second set of training pairs 330, in accordance with FIG. 6. In various embodiments, the training may be performed in a clinical setting.

FIG. 5 shows an exemplary system 500 for deploying the trained first image quality enhancement model 412 and the trained second image quality enhancement model 414 described above in reference to the TOF PET image quality enhancement model training system of FIGS. 3 and 4. In various embodiments, trained first image quality enhancement model 412 and trained second image quality enhancement model 414 may be deployed at an image quality enhancement system, such as image quality enhancement system 202 of FIG. 2, and/or a PET imaging system, such as PET imaging systems 10 and 12 of FIGS. 1A and 1B. After being trained and approved for clinical use, trained first image quality enhancement model 412 and trained second image quality enhancement model 414 may be transferred to corresponding Cherenkov luminescence-based TOF PET cameras 121*x*, where they may be used clinically to enhance diagnostic images taken in a clinical setting (e.g., clinics and hospitals 109).

In exemplary system 500, a PET scan may be performed on a patient 501 using a Cherenkov luminescence-based TOF PET imaging device 502 (e.g., a camera 121*x* of FIG. 1C). PET imaging device 502 may be the same as or similar to PET imaging device 302 of FIG. 3. In particular, PET imaging device 502 may rely on detectors including BGO crystals, where limited TOF data may be acquired using the BGO crystals by exploiting Cherenkov radiation generated during annihilation events. However, the limited TOF data may be of a lesser amount and/or a lower quality than TOF data acquired from a different PET imaging system using detectors with LOS crystals. Specifically, the TOF data acquired by PET imaging device 502 may include a small amount of higher-quality TOF data, and larger amounts of lower-quality TOF data.

Data acquired via PET imaging device 502 may be used to reconstruct three different image volumes during a PET image reconstruction stage 504. Specifically, a first image volume may be reconstructed using a first kernel 506, where the first image volume is reconstructed using data including a first set of LORs having full energy deposition at two opposing detectors of each LOR; a second image volume may be reconstructed using a second kernel 508, where the second image volume is reconstructed using data including a second set of LORs having full energy deposition at a first detector and partial energy deposition at a second detector of each LOR; and a third image volume may be reconstructed using a third kernel 510, where the third image volume is reconstructed using projection data including a third set of LORs having partial energy deposition at both detectors of each LOR.

In this way, the data acquired from patient 501 using PET imaging device 302 may be divided into three categories based on different LOR energy deposition scenarios, and a different image volume may be generated from each category of the three categories. A first quality of the first image volume may be greater than a second quality of the second image volume, due to using data including LORs with full energy deposition and no partial deposition. The second quality of the second image volume may be greater than a third quality of the third image volume, due to using data including LORs with some full and some partial energy deposition. The third quality of the third image volume may be lower than both of the first quality and the second quality of the first image volume and the second image volume, respectively, due to using data including LORs with partial energy deposition and not using data including LORs with full energy deposition.

From the different image volumes generated during PET image reconstruction stage 504, different sets of 2-D images may be extracted, where the 2-D images are slices of a relevant image volume. A first class of (2-D) images 507 may be extracted from the first image volume; a second class of (2-D) images 509 may be extracted from the second image volume; and a third class of (2-D) images 511 may be extracted from the third image volume. Due to the relative quality of the first, second, and third image volumes, an image quality of class 1 images 507 may be higher than an image quality of class 2 images 509, and the image quality of class 2 images 509 may be higher than an image quality of class 3 images 511.

The class 2 images 509 and class 3 images 511 may then be improved by trained first image quality enhancement model 412. Specifically, class 2 images 509 may be inputted into trained first image quality enhancement model 412 of FIG. 4. Trained first image quality enhancement model 412 may output a set of enhanced class 2 images 513, where enhanced class 2 images 513 are enhanced-quality images of higher quality than class 2 images 509. Enhanced class 2 images 513 may be of a similar quality as class 1 images 507. Class 3 images 511 may be inputted into trained second image quality enhancement model 414 of FIG. 4. Trained second image quality enhancement model 414 may output a set of enhanced class 3 images 515. Enhanced class 3 images 515 may be of a similar quality as class 1 images 507. In this way, by using trained first image quality enhancement model 412 to increase the quality of class 2 images 509 and using trained second image quality enhancement model 414 to increase the quality of class 3 images 511, three sets of 2-D images may be generated that are all of a comparatively high quality: class 1 images 507, enhanced class 2 images 513, and enhanced class 3 images 515.

When a user of PET imaging device 502 such as a radiologist views 2-D images corresponding to the scan performed on patient 501, one or more merged images 520 may be displayed on a display device 522, where a respective class 1 image 507, enhanced class 2 image 513, and enhanced class 3 image 515 may be merged to generate a respective merged image 520. Display device 522 may be a display device of the image quality enhancement system and/or PET imaging system (e.g., display device 234 and/or display 96 of FIG. 2 and FIG. 1B, respectively), or a different display device.

Optionally, the system can limit the option to view non merged images and displays the fully merged images. Alternatively, the user may select to view the original images before merging, and/or images reconstructed according to the prior art. These options may be released or blocked as part of the regulation approval process. Different viewing options (such as the availability to the user of the regular non-enhanced images) may be provided to different user according to their needs and sophistication (such as research institutions). The typical user will see the enhance 3D images as was generated by the approved model.

By creating the respective merged image 520 using an enhanced class 2 image 513 and an enhanced class 3 image 515, the respective merged image 520 may be of higher quality than an alternative 2-D image generated from a respective class 1 image 507 and/or generated without using TOF data.

Optionally, in some embodiments, class 1 image 507 may be used as a constraint for reconstruction of enhanced class 2 image 513, and/or the reconstruction of enhanced class 3 image 515.

In various embodiments, an enhanced 3-D image volume 521 may be created from the set of 2-D merged images 520. The enhanced 3-D image volume 521 may be viewed and processed by the user using image viewing and processing software as known in the art. For example, different planes such as transverse, coronal, sagittal and oblique planes can be viewed. Other diagnostic parameters may be extracted from the enhanced 3-D image volume 521.

Referring now to FIG. 6, an exemplary method 600 is shown for training one or more image quality enhancement models for use in a PET imaging system, such as PET imaging systems 10 and 12 of FIGS. 1A and 1B. In various embodiments, the one or more image quality enhancement models may be convolutional neural networks (CNN), such as the CNN described below in reference to FIG. 9. Method 600 may be carried out by a training module and/or a neural network module of an image quality enhancement system, such as training module 210 and/or neural network module 208 of image quality enhancement system 202 of FIG. 2. One or more instructions of method 600 may be executed by a processor of the image quality enhancement system (e.g., processor 204, AI center 103). Method 600 may be carried out within an image quality enhancement model training system, such as the model trainer 105 of FIG. 1C and/or training system 300 of FIGS. 3 and 4.

Method 600 begins at 602, where method 600 includes performing a PET scan on one or more subjects, and acquiring data of the subject(s), including TOF training data. In various embodiments, a plurality of subjects may be used. In various embodiments, the PET scan may be a low activity scan of the subjects, where the subjects are injected with a low dose of a radioactive tracer with a long life, and the radioactive tracer may be left in the subjects' bodies for some time (e.g., two days) prior to performing the PET scan. The PET scan may have a long acquisition time (e.g., zirconium), which may allow for the generation of a sufficient number of ground truth scenarios with full photoelectric energy deposition in crystals at two opposing detectors. It should be noted that training the models may rely on a large quantity of images (as explained in the text associated with FIG. 1C), and thus step 602 may be performed a plurality of times on a plurality of subjects, using a plurality of cameras.

At 604, method 600 includes reconstructing a first training image volume (e.g., image volume 307) using a first kernel (e.g., first kernel 306), where the first kernel may be optimized for processing TOF training data acquired with full photoelectric energy deposition in two detectors of an LOR. As described above in reference to FIG. 3, the first training image volume may be reconstructed using a first subset of the data, where the first subset includes LORs having full energy deposition in both detectors of each LOR. The first subset does not include LORs having partial energy deposition in either of the two detectors.

At 606, method 600 includes reconstructing a second training image volume (e.g., image volume 309) using a second kernel (e.g., second kernel 308), where the second kernel may be optimized for processing TOF training data acquired with full photoelectric energy deposition in a first detector of an LOR, and partial photoelectric energy deposition in a second detector of the LOR. The second training image volume may be reconstructed using a second subset of the data, where the second subset includes LORs having full energy deposition at a first detector of each LOR, and partial energy deposition at a second detector of the LOR. The second subset does not include LORs having full energy deposition at both detectors, nor partial energy deposition at both detectors.

At 608, method 600 includes reconstructing a third training image volume (e.g., third image volume 311) using a third kernel (e.g., third kernel 310), where the third kernel may be optimized for processing TOF training data acquired with partial photoelectric energy deposition in two detectors of an LOR. The third training image volume may be reconstructed using a third subset of the data, where the third subset includes LORs having partial energy deposition at both detectors of the LOR. The third subset does not include LORs having full energy deposition at either or both detectors.

At 610, method 600 includes generating a first set of training data pairs, where each training pair of the first set of training data pairs includes a target 2-D image selected from the first training image volume, and an input 2-D image selected from the second training image volume. The first set of training data pairs may be generated by a training data generator of the image quality enhancement system, such as training data generator 318. The target 2-D image may be used as ground truth data, where a first image quality enhancement model (first image quality enhancement model 402 of FIG. 4) may be trained to map the input 2-D image of the second volume to the target 2-D image of the first volume.

Similarly, at 612, method 600 includes generating a second set of training data pairs, where each training pair of the second set of training data pairs includes a target 2-D image selected from the first training image volume, and an input 2-D image selected from the third training image volume. As with the first set of training data pairs, the target 2-D image may be used as ground truth data, where a second image quality enhancement model (second image quality enhancement model 404 of FIG. 4) may be trained to map the input 2-D image of the third volume to the target 2-D image of the first volume.

At 614, method 600 includes training the first image quality enhancement model on the first set of training pairs, and at 616, method 600 includes training the second image quality enhancement model on the second set of training pairs. In one embodiment, either or both of the first and second image quality enhancement models may be a CNN including one or more convolutional layers, which in turn comprise one or more convolutional filters. The convolutional filters may comprise a plurality of weights, wherein the values of the weights are learned during a training procedure. The convolutional filters may correspond to one or more visual features/patterns, thereby enabling the CNN to identify and extract features from the input data.

Figure 9:
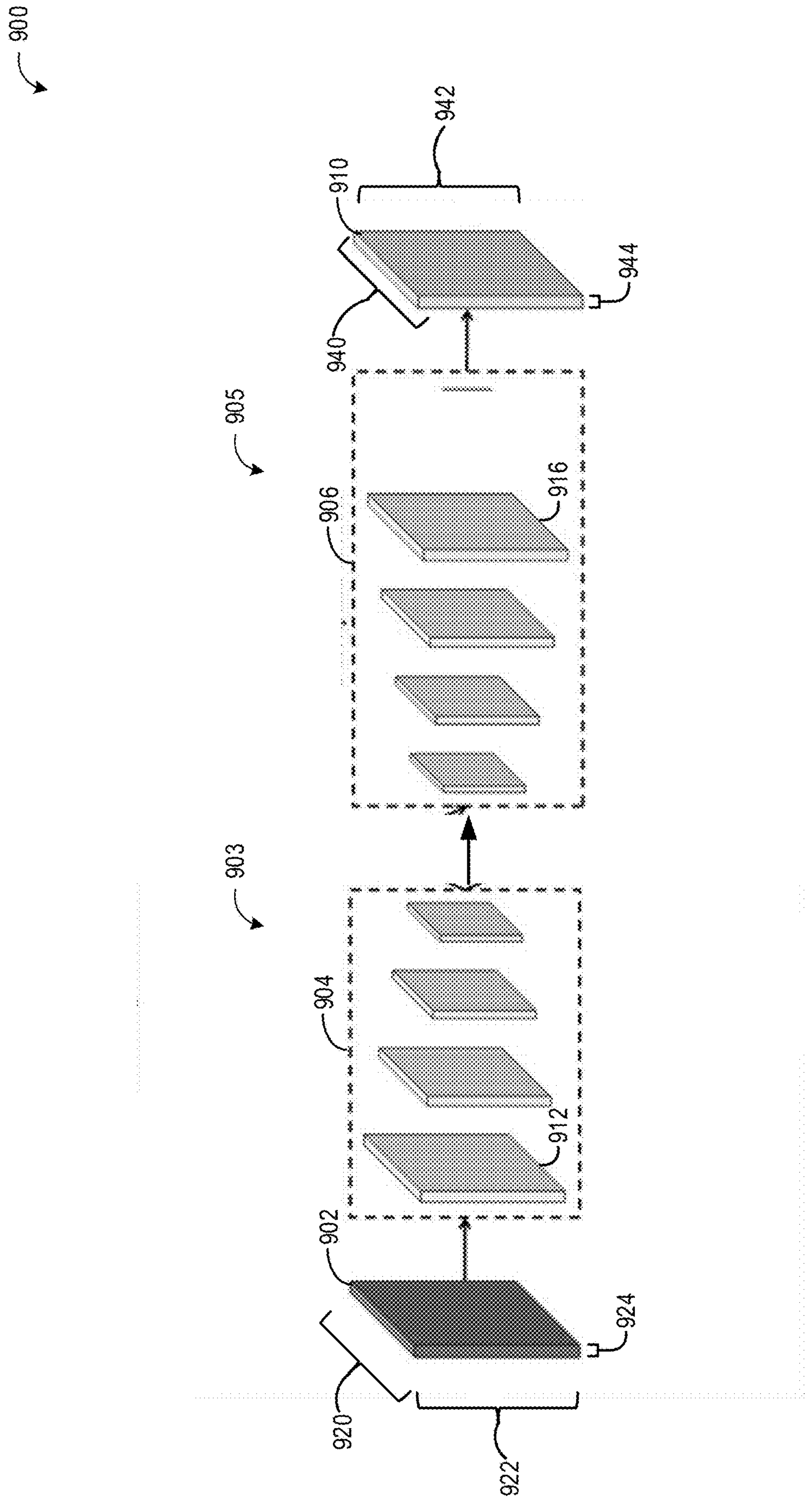
FIG. 9 shows an exemplary architecture of a TOF PET image quality enhancement model, according to one or more embodiments of the disclosure.

Referring briefly to FIG. 9, an architecture diagram of a CNN 900 is shown, according to an embodiment. CNN 900 may be used to increase a quality of PET images reconstructed by a PET imaging system, such as PET imaging systems 10 and 12 of FIGS. 1 and 2, respectively. CNN 900 may be trained in an image quality enhancement model training system, such as training system 300 described in reference to FIGS. 3 and 4. In particular, CNN 900 may be a non-limiting example of either or both of first image quality enhancement model 402 and second image quality enhancement model 404 of FIG. 4.

CNN 900 may have an encoder/decoder architecture, including an encoding portion 903 and a decoding portion 905. Encoding portion 903 includes an encoder 904. Decoding portion 905 includes a decoder 906. Each of encoder 904 and decoder 906 may include a plurality of convolutional layers constituting feature maps, depicted as solid filled rectangles in FIG. 9. In one embodiment, CNN 900 may be implemented using U-NET.

CNN 900 includes solid filled rectangles corresponding to feature maps, wherein feature maps comprise a height (top to bottom length as shown in FIG. 9, corresponding to a y spatial dimension in an x-y plane), width (as shown in FIG. 9, assumed equal in magnitude to height, corresponding to an x spatial dimension in an x-y plane), and depth (a left-right length as shown in FIG. 9, corresponding to the number of features within each feature channel).

Starting at input layer 912, an input image 902 may be inputted into CNN 900 and mapped to a first set of features. Input image 902 may be a three-dimensional (3-D) data structure with a width 920, a height 922, and a depth 924. Input image 902 may include a 2-D input image, where a width of input image may be equal to width 920 and a height of the input image may be equal to height 922. Depth 924 may correspond to a number of channels of the 2-D input image. For example, if the input image is a grayscale image, depth 924 may be 1. If the input image is a color image, depth 924 may be 3, where depth 924 includes red, green, and blue color channels. Thus, for a grayscale input image, a grayscale pixel intensity value may be included in input image 902 for each pixel of input image 902. In other examples red/green/blue (RGB) pixel intensity values may be used, which may increase the depth 924. Each pixel intensity value of each pixel may be inputted into a single neuron of input layer 912.

CNN 900 includes a series of mappings, from input image 902 received by input layer 912, through the plurality of feature maps, and finally to an output layer 916 of decoder 906. An output image 910 of CNN 900 may be generated at output layer 916, where output image 910 has a width 940 equal to width 920 of input image 902, a length 942 equal to length 922 of input image 902, and a depth corresponding to a number of channels of the image, as described above. Output image 910 includes pixel intensity values outputted by CNN 900 at output layer 916. Optionally, resizing of the output image may be performed, and the values of some or all of the width, height and depth of the output image may be different than the corresponding values of the input image.

Each feature map may receive input from a previous feature map, and may transform/map the received input to an output to produce a next feature map. Each feature map may comprise a plurality of neurons, where in some embodiments, each neuron may receive input from a subset of neurons of a previous layer/feature map, and may compute a single output based on the received inputs, wherein the output may be propagated to a subset of the neurons in a next layer/feature map. A feature map may be described using spatial dimensions, such as length and width (which may correspond to features of each pixel of the input image) wherein the dimensions refer to the number of neurons comprising the feature map (e.g., the number of neurons along a length and the number of neurons along a width of a specified feature map).

In some embodiments, the neurons of the feature maps may compute an output by performing a dot product of received inputs using a set of learned weights (each set of learned weights may herein be referred to as a filter), wherein each received input has a corresponding learned weight, wherein the learned weight was learned during training of the CNN. Thus, CNN 900 illustrates feature map transformations that occur as input image 902 is propagated through the neuron layers of the CNN.

The weights of the convolutional layers in CNN 900 are learned during training, as described in FIG. 6. During the training, a difference between output image 910 of CNN 900 and a target image (e.g., the ground truth data included in a corresponding training pair) may be back-propagated through the layers of CNN 900 to update the weights of the convolutional layers, in accordance with a loss function. CNN 900 may be trained on a plurality of training pairs of data.

It will be appreciated that the current disclosure encompasses neural network architectures comprising one or more regularization layers, including batch normalization layers, dropout layers, Gaussian noise layers, and other regularization layers known in the art of machine learning which may be used during training to mitigate overfitting and increase training efficiency while reducing training duration. Regularization layers are used during CNN training and deactivated or removed during post training implementation of the CNN. These layers may be interspersed between the layers/feature maps shown in FIG. 9, or may replace one or more of the shown layers/feature maps.

It should be understood that the architecture and configuration of CNN 900 shown in FIG. 9 is for illustration, not for limitation, and other appropriate neural networks may be used to estimate extrinsic parameters of an in-cabin camera without departing from the scope of this disclosure.

Returning to FIG. 6, training the CNN may include iteratively inputting an input image of each training image pair into an input layer of the CNN. In one embodiment, each pixel/voxel intensity value of the input image is inputted into a node of the input layer of the CNN. The CNN propagates the input image data from the input layer, through one or more hidden layers, until reaching an output layer of the CNN. In one embodiment, a first set of hidden layers (e.g., encoding portion 903 of FIG. 9) perform feature extraction (e.g., noise, edges, objects) from the image input data, and a second set of hidden layers (e.g., decoding portion 905) perform a regression that maps the extracted features to an output image outputted by the CNN.

The CNN may be configured to iteratively adjust one or more of the plurality of weights of the CNN in order to minimize a loss function, based on a difference between the output image and the input image of the training pair. The difference (or loss), as determined by the loss function, may be back-propagated through the CNN to update the weights (and biases) of the hidden (convolutional) layers. In some embodiments, back propagation of the loss may occur according to a gradient descent algorithm, wherein a gradient of the loss function (a first derivative, or approximation of the first derivative) is determined for each weight and bias of the neural network. Each weight (and bias) of the CNN is then updated by adding the negative of the product of the gradient determined (or approximated) for the weight (or bias) with a predetermined step size. Updating of the weights and biases may be repeated until the weights and biases of the CNN converge, or the rate of change of the weights and/or biases of the CNN for each iteration of weight adjustment are under a threshold.

In order to avoid overfitting, training of the CNN may be periodically interrupted to validate a performance of the CNN on the training pairs. Training of the CNN may end when a performance of the CNN on a set of test pairs converges (e.g., when an error rate on the test set converges on or within a threshold of a minimum value). In this way, during an inference stage, the CNN may receive lower-quality images reconstructed using input data with TOF information using the Cherenkov fast timing signal (lower quality data) or no TOF training data as input, and output enhanced-quality images similar to images reconstructed using higher-quality TOF training data, as described above in reference to FIG. 5. After the CNN is trained and validated, the trained CNN may be stored in a memory of the image quality enhancement system and/or PET imaging system for use in future PET exams.

FIG. 6 describes training two different image quality enhancement models or networks: a first image quality enhancement model trained using input 2-D images of the second training image volume, and a second image quality enhancement model trained using input 2-D images of the third training image volume. However, it should be appreciated that in some embodiments, a single image quality enhancement model may be trained using input 2-D images of both of the second training image volume and the third training image volume. The single image quality enhancement model may be trained to enhance the quality of both of the images of the second training image volume and the third training image volume in the manner described above. For example, the single image quality enhancement model may be trained on both of the first set of training data pairs of 2-D images and the second set of training data pairs of 2-D images. By using the single image quality enhancement model to enhance the quality of 2-D images of both of the second training image volume and the third training image volume, an efficiency of the image quality enhancement system may be increased in a deployment scenario, where the single image quality enhancement model may be used to enhance a quality of new lower quality 2-D images generated using the second and third kernels, as described below in FIG. 7. In some exemplary embodiments, a single enhanced 2-D image is generated from both of the images of the second training image volume and the third training image volume and is used to be merged with the first training image volume.

Further, while method 600 describes training one or more image quality enhancement models using training data extracted from image volumes reconstructed using various kernels optimized for different energy deposition scenarios, it should be appreciated that in other embodiments, method 600 may be applied to data acquired from the subject during the PET scan prior to reconstruction. In other words, in one embodiment, the process uses the 2D reconstructed slices, alternatively sinogram or event list data format may be used.

Figure 7:
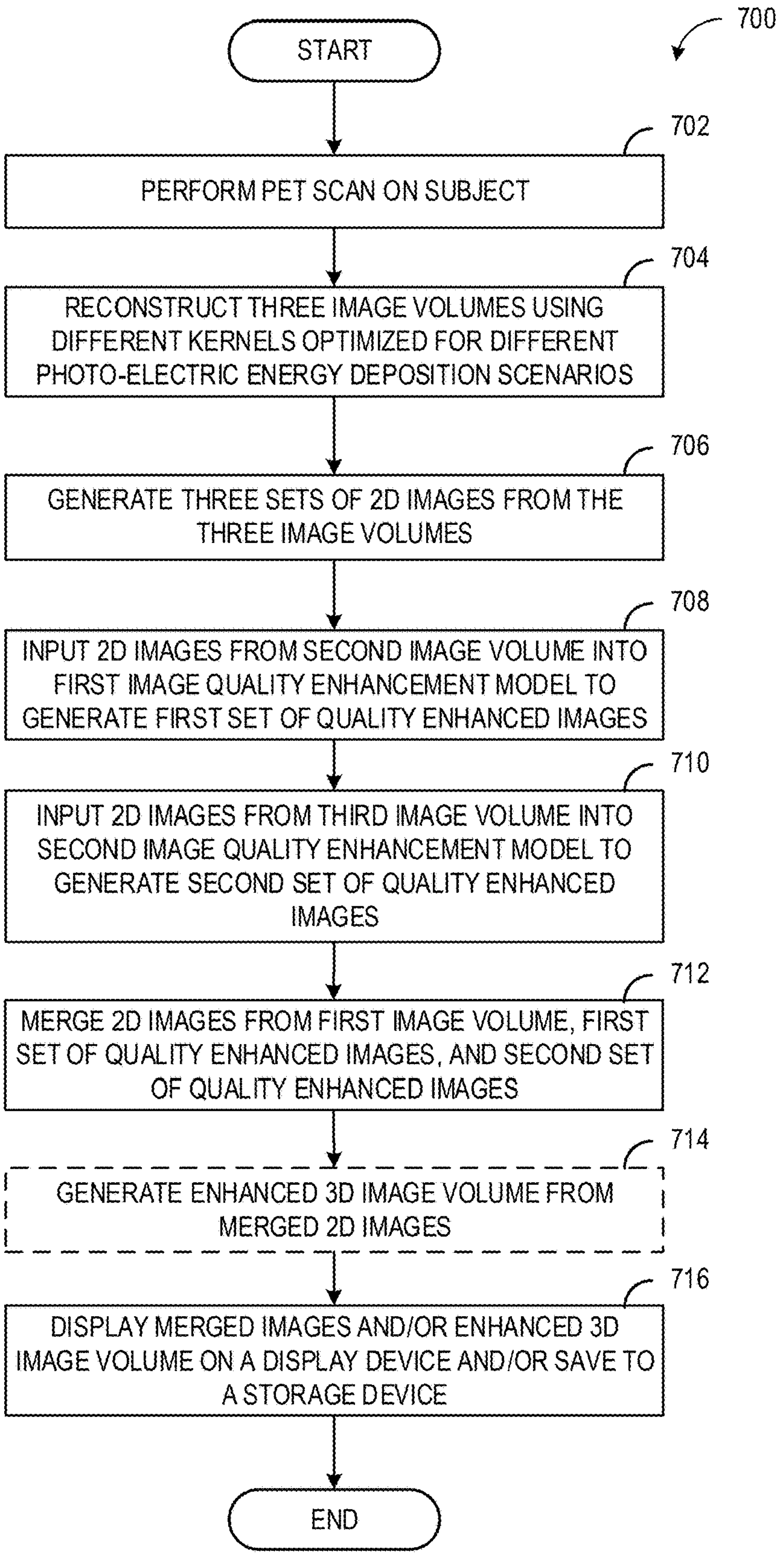
FIG. 7 is a flowchart illustrating an exemplary method for deploying the TOF PET image quality enhancement model to increase a quality of PET images reconstructed using TOF data, according to one or more embodiments of the disclosure.

Referring now to FIG. 7, an exemplary method 700 is shown for using one or more trained image quality enhancement models of an image quality enhancement system (e.g., image quality enhancement system 202 of FIG. 2) to increase a quality of images reconstructed by the PET imaging system with Cherenkov luminescence-based TOF PET or lower-quality TOF data (e.g., due to a high frequency of LORs with partial energy deposition), as described above in reference to FIG. 5. The image quality enhancement system may be used in conjunction with a PET imaging system, such as PET imaging systems 10 and 12 of FIGS. 1A and 1B and the cameras 121*x* of FIG. 1C. Method 700 may be carried out by an inference module of the image quality enhancement system, such as inference module 212 of FIG. 2. One or more instructions of method 700 may be executed by a processor of the image quality enhancement system (e.g., processor 204).

Method 700 begins at 702, where method 700 includes performing a PET scan on a subject, where data is acquired from the subject. The data may include TOF patient data based on Cherenkov light emission.

At 704, method 700 includes reconstructing three different patient image volumes, using three different kernels, where each kernel of the three different kernels is optimized for a different photoelectric energy deposition scenario, as described above in reference to FIG. 6. Specifically, a first patient image volume is reconstructed using a first kernel (e.g., first kernel 506), where the first kernel may be optimized for processing TOF patient data acquired with full photoelectric energy deposition in two detectors of an LOR. The first patient image volume may be reconstructed using a first subset of the data, where the first subset includes LORs having full energy deposition in both detectors of each LOR. The first subset does not include LORs having partial energy deposition in either of the two detectors. A second patient image volume is reconstructed using a second kernel (e.g., second kernel 508), where the second kernel may be optimized for processing TOF patient data acquired with full photoelectric energy deposition in a first detector of an LOR, and partial photoelectric energy deposition in a second detector of the LOR. The second patient image volume may be reconstructed using a second subset of the data, where the second subset includes LORs having full energy deposition at a first detector of each LOR, and partial energy deposition at a second detector of the LOR. The second subset does not include LORs having full energy deposition at both detectors, nor partial energy deposition at both detectors. A third patient image volume may be reconstructed using a third kernel (e.g., third kernel 510), where the third kernel may be optimized for processing TOF patient data acquired with partial photoelectric energy deposition in two detectors of an LOR. The third patient image volume may be reconstructed using a third subset of the data, where the third subset includes LORs having partial energy deposition at both detectors of the LOR. The third subset does not include LORs having full energy deposition at either or both detectors.

At 706, method 700 includes generating three sets of 2-D images from the three patient image volumes reconstructed using the three different kernels. The three sets of 2-D images may be non-limiting examples of class 1 images 507, class 2 images 509, and class 3 images 511 of FIG. 5. A quality of 2-D images from each set of the three sets of 2-D images may be different. In particular, a first quality of a first set of 2-D images reconstructed using the first kernel may be higher than a second quality of a second set of 2-D images reconstructed using the second kernel, which in turn may be higher than a third quality of the third set of 2-D images reconstructed using the third kernel.

At 708, method 700 includes inputting the second set of 2-D images into a first trained image quality enhancement model to generate a first set of enhanced-quality 2-D images, where the first set of enhanced-quality 2-D images are higher-quality versions of the second set of 2-D images. The first trained image quality enhancement model may be a non-limiting example of trained first image quality enhancement model 412 of FIG. 4.

At 710, method 700 includes inputting the third set of 2-D images into a second trained image quality enhancement model to generate a second set of enhanced-quality 2-D images, where the second set of enhanced-quality 2-D images are higher-quality versions of the third set of 2-D images. The second trained image quality enhancement model may be a non-limiting example of trained second image quality enhancement model 414 of FIG. 4.

It should be appreciated that in some embodiments, a single trained image quality enhancement model may be used to generate both of the first set of enhanced-quality 2-D images and the second set of enhanced-quality 2-D images. In other words, the single trained image quality enhancement model may be similar to either or both of the first trained image quality enhancement model and the second trained image quality enhancement model, and the single trained image quality enhancement model may be trained on sets of 2-D images similar to the second set of 2-D images and the third set of 2-D images, as described above in reference to FIG. 6. In such embodiments, the second set of 2-D images may be inputted into the single trained image quality enhancement model to generate the first set of enhanced-quality 2-D images, and the third set of 2-D images may be inputted into the single trained image quality enhancement model to generate the second set of enhanced-quality 2-D images.

At 712, method 700 includes merging 2-D images of the first patient image volume, the first set of enhanced-quality 2-D images generated using the first trained image quality enhancement model, and the second set of enhanced-quality 2-D images generated using the second trained image quality enhancement model to generate a set of merged images (e.g. merged images 520 of FIG. 5). For example, a first 2-D image of the first patient image volume may be merged with a first 2-D image of the first set of enhanced-quality 2-D images corresponding to a same location of the second patient image volume, and a first 2-D image of the second set of enhanced-quality 2-D images corresponding to the same location of the patient image volume; a second 2-D image of the first patient image volume may be merged with a corresponding second 2-D image of the first set of enhanced-quality 2-D images and a corresponding second 2-D image of the second set of enhanced-quality 2-D images; a third 2-D image of the first patient image volume may be merged with a corresponding third 2-D image of the first set of enhanced-quality 2-D images and a corresponding third 2-D image of the second set of enhanced-quality 2-D images; and so on.

The set of merged images may be of a higher quality than 2-D images extracted from a single patient image volume reconstructed using the three different kernels, where the three different kernels are alternately applied to data based on differing energy deposition scenarios occurring at each LOR of the projection data. The set of merged images may also be of a higher quality than the first set of 2-D images extracted from the first patient image volume, due to having an increased amount of information obtained from the enhanced second and third sets of 2-D images.

At 714, method 700 includes optionally combining the merged 2-D images to generate an enhanced 3-D image volume, where the enhanced 3-D image volume may be of higher quality than an alternative 3-D image volume reconstructed using the three different kernels alternately applied to data based on differing energy deposition scenarios occurring at each LOR of the projection data. The enhanced 3-D image volume may be processed and navigated to display different views of the enhanced 3-D image volume.

At 716, method 700 includes displaying the set of merged images and/or the enhanced 3-D image volume on a display device. The display device may be a display device of the image quality enhancement system and/or PET imaging system, or a display device of a different system. The merged images may be displayed in real time as a user of the PET imaging system navigates through a reconstructed image volume. For example, the user may navigate through the enhanced 3-D image volume, and slices of the enhanced 3-D image volume corresponding to the merged images may be displayed on the display device. In other embodiments, in response to a user of the PET imaging system selecting a slice of a different image volume reconstructed from projection data acquired from the patient, a merged image of the set of merged images corresponding to the slice may be displayed on the display device. In this way, 2-D images (e.g., slices) of a lower quality may be replaced with the higher-quality merged images.

Additionally, or alternatively, a set of merged images may be stored in the image quality enhancement system and/or PET imaging system. The user of the PET imaging system, such as a radiologist, may view the merged images on the display device. As a result of the merged images being of higher quality than an alternative set of images generated without relying on the first, second, or single image quality enhancement models, an ability of the radiologist to view anatomical structures of the subject in the displayed images may be increased, resulting in a more accurate diagnosis of a condition of the subject.

A trained radiologist may review the merged images to determine a patient diagnosis using an image display and processing software known in the art, on a workstation. Optionally, said workstation is part of a PET camera. However, a remote terminal or workstation may be used. A hospital network may be used to store and review the merged images at later time. Image processing software may be applied to provide clinical data such as cardiac output, quantification of radiopharmaceutical concentration within target organs, and the like. Repeated or long duration acquisition may be used to create a time dependent (dynamic) 4-D image to provide time evolution data of the radiopharmaceutical within the patient.

FIG. 7 describes using two different trained image quality enhancement models or networks: a first image quality enhancement model used to increase a quality of 2-D images of the second patient image volume, and a second image quality enhancement model used to increase a quality of 2-D images of the third patient image volume. However, as described above, it should be appreciated that in some embodiments, a single image quality enhancement model may be used to generate enhanced quality 2-D images of both of the second patient image volume and the third patient image volume. For example, the single image quality enhancement model takes as input either or both of the 2-D images of the first patient image volume and the second patient image volume, and output quality enhanced images of an image quality similar to the image quality of the first patient image volume. By using the single image quality enhancement model to enhance the quality of 2-D images of both of the second patient image volume and the third patient image volume, an efficiency of the image quality enhancement system may be increased. Additionally, a processing speed of the image quality enhancement system may be increased, which may reduce a delay in viewing increase quality images on the display device.

Thus, a robust image quality enhancement system is proposed herein that may increase a quality of 2-D images generated from a subject during a PET scan, using TOF data based on detected Cherenkov light emissions occurring after positron annihilation events. In particular, a majority of the TOF data may be lower-quality data, due to partial energy deposition occurring in one or more detectors for LORs generated from the annihilation events. The lower TOF data may decrease the quality of 2-D images reconstructed from acquired data. To increase the quality of the 2-D images, one or more image quality enhancement models may be trained to map a first set of images generated from the lower-quality TOF data to a second set of images generated from higher-quality TOF data acquired when full energy deposition occurs in two opposing detectors of an LOR. Once trained, the one or more image quality enhancement models may take as input lower-quality reconstructed images generated from data acquired from subjects of a PET scan, and output higher-quality reconstructed images for display on a display screen. By using the image quality enhancement models to increase the quality of the images displayed to a radiologist on the display screen, quality issues deriving from the lower-quality TOF data may be mitigated. As a result, a first PET imaging system having detectors with BGO crystals may advantageously use Cherenkov TOF data to generate images of a comparable quality to a second PET imaging system having detectors with more expensive LSO crystals.

The technical effect of training an image quality enhancement model to map a first set of images generated using lower-quality TOF data generated by exploiting Cherenkov luminescence, to a second set of images generated using higher-quality TOF data generated by exploiting the Cherenkov luminescence, is that a quality of images reconstructed using TOF data generated by exploiting the Cherenkov luminescence may be increased.

The disclosure also provides support for a method for imaging using a positron emission tomography (PET) system, the method comprising: extracting at least one higher-quality 2-D image from at least one first patient image volume reconstructed using higher-quality time-of-flight (TOF) patient data acquired from a subject during a scan, the higher-quality TOF patient data based on Cherenkov radiation detected at bismuth germinate (BGO) crystals of the PET system, extracting at least one lower-quality 2-D image from a second patient image volume reconstructed using lower-quality TOF patient data acquired from the subject during the scan, generating at least one enhanced-quality 2-D image from the lower-quality 2-D image using a trained image quality enhancement model, merging the at least one enhanced-quality 2-D image with the higher-quality 2-D image to generate at least one merged 2-D image, and displaying the at least one merged 2-D image on a display device. In a first example of the method, the lower-quality TOF patient data further comprises: a first class of lower-quality TOF patient data comprising a first plurality of first class photon pairs, each first class photon pair created by an annihilation event where a full amount of energy of a first photon of the first class photon pair is deposited at a first detector of the PET system, and a partial amount of energy of a second photon of the first class photon pair is deposited at a second detector of the PET system, a second class of lower-quality TOF patient data comprising a second plurality of second class photon pairs, each second class photon pair created by an annihilation event where a partial amount of energy of a first photon of the second class photon pair is deposited at a third detector of the PET system, and a partial amount of energy a second photon of the second class photon pair is deposited at a fourth detector of the PET system, and the higher-quality TOF patient data further comprises a third plurality of higher-quality photon pairs, each higher-quality photon pair created by an annihilation event where a full amount of energy of a first photon of the higher-quality photon pair is deposited in a fifth detector of the PET system and a full amount of energy of a second photon of the higher-quality photon pair is deposited in a sixth detector of the PET system, wherein the PET system is one of a Cherenkov luminescence-based TOF PET system and a Cherenkov luminescence-based PET-CT system. In a second example of the method, optionally including the first example, the full amounts of energy deposited by the first photon of the first class photon pair, the first photon of the higher-quality photon pair, and the second photon of the higher-quality photon pair are deposited at the first, fifth, and sixth detectors, respectively, by a photoelectric absorption in a first, fifth, and sixth BGO crystal, respectively, of the PET system, and the partial amounts of energy of the second photon of the first class photon pair, the first photon of the second class photon pair, and the second photon of the second class photon pair are deposited at the second, third, and fourth detectors, respectively, by a Compton scattering in a second, third, and fourth BGO crystal, respectively, of the PET system. In a third example of the method, optionally including one or both of the first and second examples, generating the at least one enhanced-quality 2-D image from the at least one lower-quality 2-D image using the trained image quality enhancement model further comprises generating the at least one enhanced-quality 2-D image using a processor of the PET system. In a fourth example of the method, optionally including one or more or each of the first through third examples, the image quality enhancement model is a convolutional neural network (CNN) with an encoder/decoder architecture. In a fifth example of the method, optionally including one or more or each of the first through fourth examples, the trained image quality enhancement model is a first trained image quality enhancement model used to generate a first enhanced-quality 2-D image from a first lower-quality 2-D image extracted from a third patient image volume reconstructed using the first class of lower-quality TOF patient data, and generating the at least one enhanced-quality 2-D image from the lower-quality 2-D image using the trained image quality enhancement model and merging the enhanced-quality 2-D image with the higher-quality 2-D image to generate the merged 2-D image further comprises: using a second trained image quality enhancement model to generate a second enhanced-quality 2-D image from a second lower-quality 2-D image extracted from a fourth patient image volume reconstructed using the second class of the lower-quality TOF patient data, and merging all of the first enhanced-quality 2-D image, the second enhanced-quality 2-D image, and the higher-quality 2-D image to generate the merged 2-D image. In a sixth example of the method, optionally including one or more or each of the first through fifth examples, the first trained image quality enhancement model and the second trained image quality enhancement model are trained and validated at an artificial intelligence (AI) center external to the PET system. In a seventh example of the method, optionally including one or more or each of the first through sixth examples, the method further comprises: storing the merged 2-D image in a memory of the PET system, and in response to a user of the PET system selecting a slice of an image volume of the subject displayed on the display device, the slice corresponding to the stored merged 2-D image: retrieving the stored merged 2-D image from the memory, and displaying the retrieved merged 2-D image on the display device of the PET system. In an eighth example of the method, optionally including one or more or each of the first through seventh examples, the method further comprises: generating an enhanced 3-D image volume including the merged 2-D image, and displaying the enhanced 3-D image volume on the display device, and displaying the merged 2-D image on the display device as a slice of the enhanced 3-D image volume. In a ninth example of the method, optionally including one or more or each of the first through eighth examples, the first trained image quality enhancement model is trained on a first set of training pairs of images, each training pair of the first set of training pairs of images including a ground truth image extracted from a first training image volume reconstructed using higher-quality TOF training data, and an input image extracted from a second training image volume reconstructed from a first class of lower-quality TOF training data and not from a second class of lower-quality TOF training data, and the second trained image quality enhancement model is trained on a second set of training pairs of images, each training pair of the second set of training pairs of images including a ground truth image extracted from the first training image volume, and an input image extracted from a third training image volume reconstructed from the second class of lower-quality TOF training data and not from the first class of lower-quality TOF training data. In a tenth example of the method, optionally including one or more or each of the first through ninth examples, the first training image volume is reconstructed using a first kernel optimized for use on the higher-quality TOF training data, the second training image volume is reconstructed using a second kernel optimized for use on the first class of lower-quality TOF training data, and the third training image volume is reconstructed using a third kernel optimized for use on the second class of lower-quality TOF training data. In a eleventh example of the method, optionally including one or more or each of the first through tenth examples, the at least one higher-quality 2-D image includes a plurality of higher-quality 2-D images, the at least one lower-quality 2-D image includes a plurality of lower-quality 2-D images, and the at least one enhanced-quality 2-D image includes a plurality of enhanced-quality 2-D images.

The disclosure also provides support for a positron emission tomography (PET) system, comprising: a processor and a non-transitory memory including instructions that when executed, cause the processor to: during a scan of a subject using the PET system: acquire time-of-flight (TOF) data based on Cherenkov radiation detected at detectors of the PET system including bismuth germinate (BGO) crystals, classify the TOF data into higher-quality TOF data and lower-quality TOF data, reconstruct a first image volume using the higher-quality TOF data, reconstruct a second image volume using the lower-quality TOF data, input a first 2-D image extracted from the second image volume into a first trained image quality enhancement model to generate an enhanced-quality 2-D image, merge the enhanced-quality 2-D image with a second 2-D image extracted from the first image volume to generate a merged image, and display the merged image on a display device and/or store the merged image in the non-transitory memory, wherein: the first image volume is reconstructed using a first kernel optimized for use on the higher-quality TOF data, and the second image volume is reconstructed using a second kernel optimized for use on the lower-quality TOF data. In a first example of the system, the lower-quality TOF data includes a first class of lower-quality TOF data and a second class of lower-quality TOF data, the second class of lower quality than the first class, the second image volume is reconstructed from the first class of lower-quality TOF data, a third image volume is reconstructed from the second class of lower-quality TOF data, and further instructions are stored in the non-transitory memory that when executed, cause the processor to: input a third 2-D image extracted from the third image volume into a second trained image quality enhancement model to generate a second enhanced-quality 2-D image, and merge the enhanced-quality 2-D image with both of the second enhanced-quality 2-D image and the second 2-D image extracted from the first image volume to generate the merged image. In a second example of the system, optionally including the first example, further instructions are stored in the non-transitory memory that when executed, cause the processor to: store the merged image in the non-transitory memory of the PET system, and replace a slice of an image volume being displayed on the display device with the stored, merged image. In a third example of the system, optionally including one or both of the first and second examples, the system further comprises: a first set of PET and/or PET-CT cameras, the first set of PET and/or PET-CT cameras including Cherenkov luminescence-based TOF PET cameras and/or true TOF capability cameras. In a fourth example of the system, optionally including one or more or each of the first through third examples, the first trained image quality enhancement model and the second trained image quality enhancement model are trained at an AI center external to the PET system, based on lower-quality TOF data and higher-quality TOF data acquired via a second set of PET and/or PET-CT cameras, the second set of PET and/or PET-CT cameras including Cherenkov luminescence-based TOF-PET cameras and/or true TOF capability cameras.

The disclosure also provides support for a method for a positron emission tomography (PET) system, the method comprising: performing a scan on a subject using the PET system to acquire a set of data of the subject, from the set of data, reconstructing a first image volume using a first kernel, a second image volume using a second kernel, and a third image volume using a third kernel, extracting a first plurality of 2-D images from the first image volume, a second plurality of 2-D images from the second image volume, and a third plurality of 2-D images from the third image volume, inputting the second plurality of 2-D images into a first trained image quality enhancement model to generate a first respective plurality of enhanced-quality 2-D images, inputting the third plurality of 2-D images into a second trained image quality enhancement model to generate a second respective plurality of enhanced-quality 2-D images, merging each image of the first plurality of 2-D images with a corresponding image of the first respective plurality of enhanced-quality 2-D images, and a corresponding image of the second respective plurality of enhanced-quality 2-D images, to create a merged set of images, generating an enhanced 3-D image volume from the merged set of images, and displaying the enhanced 3-D image volume on a display device. In a first example of the method, the method further comprises: storing the merged set of images in a memory the PET system, and in response to a user of the PET system selecting a slice of an image volume of the subject displayed on the display device, retrieving an image of the stored, merged images corresponding to the slice and displaying the retrieved image on the display device.

The disclosure also provides support for a method, comprising: receiving time-of-flight (TOF) patient data acquired from a plurality of scans of a plurality of subjects using a first positron emission tomography (PET) system, for each scan of the plurality of scans: separating the TOF patient data into higher-quality TOF patient data and lower-quality TOF patient data, reconstructing a first image volume using the higher-quality TOF patient data, reconstructing a second image volume using the lower-quality TOF patient data, and generating a plurality of training pairs of 2-D images, each training pair of the plurality of training pairs including a ground truth image extracted from the first image volume, and an input image extracted from the second image volume, and training an image quality enhancement model on the plurality of training pairs of 2-D images, to map a first 2-D image reconstructed using the lower-quality TOF patient data acquired from a subject using the first PET system to a second, higher-quality 2-D image reconstructed using higher-quality TOF patient data acquired from the subject using the first PET system, and deploying the trained image quality enhancement model at a second PET system in a healthcare facility. In a first example of the method, the first PET system includes one of a Cherenkov luminescence-based TOF PET camera and a PET-computed tomography (CT) camera, and the higher-quality TOF patient data and lower-quality TOF patient data is based on Cherenkov radiation detected at bismuth germinate (BGO) crystals included in detectors of the first PET system. In a second example of the method, optionally including the first example, the lower-quality TOF patient data further comprises: a first class of lower-quality TOF patient data where a full amount of photoelectric energy of a first photon generated by a first annihilation event is deposited at a first detector of the first PET system, and a partial amount of photoelectric energy of a second photon generated by the first annihilation event is deposited at a second detector of the first PET system, and a second class of lower-quality TOF patient data where a partial amount of photoelectric energy of a third photon generated by a second annihilation event is deposited at a third detector of the first PET system, and a partial amount of photoelectric energy of a fourth photon generated by the second annihilation event is deposited at a fourth detector of the first PET system, the second class of lower-quality TOF patient data of a lower quality than the first class of lower-quality TOF patient data, and the higher-quality TOF patient data includes TOF patient data where a full amount of photoelectric energy of a fifth photon generated by a third positron annihilation event is deposited in a fifth detector of the first PET system and a full amount of photoelectric energy of a sixth photon generated by the third positron annihilation event is deposited in a sixth detector of the first PET system. In a third example of the method, optionally including one or both of the first and second examples, the method further comprises: reconstructing a third image volume from the first class of lower-quality TOF patient data and not from the second class of lower-quality TOF patient data, and reconstructing a fourth image volume from the second class of lower-quality TOF patient data and not from the first class of lower-quality TOF patient data. In a fourth example of the method, optionally including one or more or each of the first through third examples, the method further comprises: reconstructing the first image volume using a first kernel on the higher-quality TOF patient data, reconstructing the third image volume using a second kernel on the first class of lower-quality TOF patient data, and reconstructing the fourth image volume using a third kernel on the second class of lower-quality TOF patient data. In a fifth example of the method, optionally including one or more or each of the first through fourth examples, the method further comprises: creating a first set of training pairs of images, each training pair of the first set of training pairs of images including a ground truth image extracted from the first image volume, and an input image extracted from the third image volume, and creating a second set of training pairs of images, each training pair of the second set of training pairs of images including a target, ground truth image extracted from the first image volume, and an input image extracted from the fourth image volume. In a sixth example of the method, optionally including one or more or each of the first through fifth examples, the method further comprises: training the image quality enhancement model on both of the first set of training pairs of images and the second set of training pairs of images. In a seventh example of the method, optionally including one or more or each of the first through sixth examples, the image quality enhancement model is a first image quality enhancement model trained on the first set of training pairs of images, and further comprising: training a second image quality enhancement model on the second set of training pairs of images, and deploying both of the first trained image quality enhancement model and the trained image quality enhancement model at the second PET system. In an eighth example of the method, optionally including one or more or each of the first through seventh examples, the first trained image quality enhancement model and the second trained image quality enhancement model include convolutional neural networks (CNN) with an encoder/decoder architecture. In a ninth example of the method, optionally including one or more or each of the first through eighth examples, the trained image quality enhancement model is used to increase a quality of images reconstructed at the second PET system.

The disclosure also provides support for an image quality enhancement system, comprising: a processor and a non-transitory memory including instructions that when executed, cause the processor to: train one or more image quality enhancement models to map a first 2-D image reconstructed using lower-quality time-of-flight (TOF) patient data acquired from a subject using a first positron emission tomography (PET) system to a second, higher-quality 2-D image reconstructed using higher-quality TOF patient data acquired from the subject using the PET system, and deploy the trained one or more image quality enhancement models at an installed base of one or more second PET systems in one or more healthcare facilities, to enhance an image quality of images generated using the one or more second PET systems. In a first example of the system, the higher-quality TOF patient data and lower-quality TOF patient data is based on Cherenkov radiation detected at bismuth germinate (BGO) crystals included in detectors of the first PET system. In a second example of the system, optionally including the first example, the lower-quality TOF patient data further comprises: a first class of lower-quality TOF patient data where a full amount of photoelectric energy of a first photon generated by a first annihilation event is deposited at a first detector of the first PET system, and a partial amount of photoelectric energy of a second photon generated by the first annihilation event is deposited at a second detector of the first PET system, and a second class of lower-quality TOF patient data where a partial amount of photoelectric energy of a third photon generated by a second annihilation event is deposited at a third detector of the first PET system, and a partial amount of photoelectric energy of a fourth photon generated by the second annihilation event is deposited at a fourth detector of the first PET system, and the higher-quality TOF patient data includes TOF patient data where a full amount of photoelectric energy of a fifth photon generated by a third positron annihilation event is deposited in a fifth detector of the first PET system and a full amount of photoelectric energy of a sixth photon generated by the third positron annihilation event is deposited in a sixth detector of the first PET system. In a third example of the system, optionally including one or both of the first and second examples, further instructions are stored in the non-transitory memory that when executed, cause the processor to: receive TOF patient data acquired from a plurality of scans of a plurality of subjects performed using the first PET system, and for each scan of the plurality of scans: reconstruct a first image volume from the higher-quality TOF patient data, reconstruct a second image volume from the first class of the lower-quality TOF patient data, reconstruct a third image volume from the second class of the lower-quality TOF patient data. In a fourth example of the system, optionally including one or more or each of the first through third examples, the first image volume is reconstructed by applying a first kernel to the higher-quality TOF patient data, the second image volume is reconstructed by applying a second kernel to the first class of lower-quality TOF patient, and the third image volume is reconstructed by applying a third kernel on the second class of lower-quality TOF patient. In a fifth example of the system, optionally including one or more or each of the first through fourth examples, further instructions are stored in the non-transitory memory that when executed, cause the processor to: train a first image quality enhancement model of the one or more image quality enhancement models on a first set of training pairs of images, each training pair of the first set of training pairs of images including a ground truth image extracted from the first image volume, and an input image extracted from the second image volume, train a second image quality enhancement model of the one or more image quality enhancement models on a second set of training pairs of images, each training pair of the second set of training pairs of images including a ground truth image extracted from the first image volume, and an input image extracted from the third image volume, and deploy both of the first trained image quality enhancement model and the second trained image quality enhancement model at the installed base of one or more second PET systems in the one or more healthcare facilities. In a sixth example of the system, optionally including one or more or each of the first through fifth examples, the first trained image quality enhancement model and the second trained image quality enhancement model are trained at an AI center external to the installed base of one or more second PET systems. In a seventh example of the system, optionally including one or more or each of the first through sixth examples, the first trained image quality enhancement model and the second trained image quality enhancement model include convolutional neural networks (CNN) with an encoder/decoder architecture.

The disclosure also provides support for a system, comprising: a first set of PET and/or PET-CT cameras, the first set of PET and/or PET-CT cameras including Cherenkov luminescence-based TOF PET cameras, a second set of PET and/or PET-CT cameras installed at one or more healthcare facilities, different from the first set of PET and/or PET-CT cameras, an image quality enhancement system including an image quality enhancement model and a processor and a non-transitory memory including instructions that when executed, cause the processor to: train the image quality enhancement model, using training data acquired via the first set of PET and/or PET-CT cameras, to map a first 2-D image reconstructed using lower-quality time-of-flight (TOF) patient data acquired from a subject of a PET system including the first set of PET and/or PET-CT cameras to a second, higher-quality 2-D image reconstructed using higher-quality TOF patient data acquired from the subject, and deploy the image quality enhancement model to the second set of PET and/or PET-CT cameras to be used clinically to enhance diagnostic images at the one or more healthcare facilities. In a first example of the system, the lower-quality TOF patient data and the higher-quality TOF patient data is based on Cherenkov radiation detected at bismuth germinate (BGO) crystals included in detectors of the first set of PET and/or PET-CT cameras.

It should be noted that the terms "quality", when it refers to data sets, for example: lower-quality TOF data ", etc., is meant in accordance to some embodiments to indicate the relative quality of the timing resolution of the events included in the set (the shorter the timing uncertainty-the higher the "quality" of a photon pair). The quality of an image derived from a set of data is strongly depends on the number of photon pairs in the data set. Thus, a larger number of lower quality photon pairs may yield (after reconstruction) a similar, or even higher quality image. Different reconstruction algorithms, or using different parameters with same reconstruction algorithm may influence the quality of the resulting image as well. This definition can be used when interpreting the text and the claims.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information enhancement described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for imaging using a positron emission tomography (PET) system, the method comprising:

extracting at least one higher-quality 2-D image from at least one first patient image volume reconstructed based on higher-quality time-of-flight (TOF) patient data acquired from a subject during a scan, the higher-quality TOF patient data based on Cherenkov radiation detected at bismuth germinate (BGO) crystals of the PET system, the higher-quality TOF patient data comprising photon pairs created by annihilation events where a full amount of energy of each photon of each photon pair is deposited at a detector of the PET system;

extracting at least one lower-quality 2-D image from a second patient image volume reconstructed based on lower-quality TOF patient data acquired from the subject during the scan, the lower-quality TOF patient data based on Cherenkov radiation detected at the BGO crystals of the PET system, the lower-quality TOF patient data comprising photon pairs created by annihilation events where a full amount of energy of each photon of each photon pair is not deposited at any detector of the PET system;

generating at least one enhanced-quality 2-D image from the lower-quality 2-D image using a trained image quality enhancement model;

merging the at least one enhanced-quality 2-D image with the higher-quality 2-D image to generate at least one merged 2-D image; and displaying the at least one merged 2-D image on a display device.

2. The method of claim 1, wherein the lower-quality TOF patient data further comprises:

a first class of lower-quality TOF patient data comprising a first plurality of first class photon pairs, each first class photon pair created by an annihilation event where a full amount of energy of a first photon of the first class photon pair is deposited at a first detector of the PET system, and a partial amount of energy of a second photon of the first class photon pair is deposited at a second detector of the PET system;

a second class of lower-quality TOF patient data comprising a second plurality of second class photon pairs, each second class photon pair created by an annihilation event where a partial amount of energy of a first photon of the second class photon pair is deposited at a third detector of the PET system, and a partial amount of energy a second photon of the second class photon pair is deposited at a fourth detector of the PET system, and the higher-quality TOF patient data further comprises a third plurality of higher-quality photon pairs, each higher-quality photon pair created by an annihilation event where a full amount of energy of a first photon of the higher-quality photon pair is deposited in a fifth detector of the PET system and a full amount of energy of a second photon of the higher-quality photon pair is deposited in a sixth detector of the PET system;

wherein the PET system is one of a Cherenkov luminescence-based TOF PET system or a Cherenkov luminescence-based PET-CT system.

3. The method of claim 2, wherein:

the full amounts of energy deposited by the first photon of the first class photon pair, the first photon of the higher-quality photon pair, and the second photon of the higher-quality photon pair are deposited at the first, fifth, and sixth detectors, respectively, by a photoelectric absorption in a first, fifth, and sixth BGO crystal, respectively, of the PET system; and the partial amounts of energy of the second photon of the first class photon pair, the first photon of the second class photon pair, and the second photon of the second class photon pair are deposited at the second, third, and fourth detectors, respectively, by a Compton scattering in a second, third, and fourth BGO crystal, respectively, of the PET system.

4. The method of claim 3, wherein the image quality enhancement model is a convolutional neural network (CNN) with an encoder/decoder architecture.

5. The method of claim 1, wherein generating the at least one enhanced-quality 2-D image from the at least one lower-quality 2-D image using the trained image quality enhancement model further comprises generating the at least one enhanced-quality 2-D image using a processor of the PET system.

6. The method of claim 1, wherein the trained image quality enhancement model is a first trained image quality enhancement model used to generate a first enhanced-quality 2-D image from a first lower-quality 2-D image extracted from a third patient image volume reconstructed using the first class of lower-quality TOF patient data; and generating the at least one enhanced-quality 2-D image from the lower-quality 2-D image using the trained image quality enhancement model and merging the enhanced-quality 2-D image with the higher-quality 2-D image to generate the merged 2-D image further comprises:

using a second trained image quality enhancement model to generate a second enhanced-quality 2-D image from a second lower-quality 2-D image extracted from a fourth patient image volume reconstructed using the second class of the lower-quality TOF patient data; and merging all of the first enhanced-quality 2-D image, the second enhanced-quality 2-D image, and the higher-quality 2-D image to generate the merged 2-D image.

7. The method of claim 6, wherein the first trained image quality enhancement model and the second trained image quality enhancement model are trained and validated at an artificial intelligence (AI) center external to the PET system.

8. The method of claim 6, further comprising:

storing the merged 2-D image in a memory of the PET system; and in response to a user of the PET system selecting a slice of an image volume of the subject displayed on the display device, the slice corresponding to the stored merged 2-D image:

retrieving the stored merged 2-D image from the memory; and displaying the retrieved merged 2-D image on the display device of the PET system.

9. The method of claim 6, further comprising:

generating an enhanced 3-D image volume including the merged 2-D image; and displaying the enhanced 3-D image volume on the display device, and displaying the merged 2-D image on the display device as a slice of the enhanced 3-D image volume.

10. The method of claim 6, wherein the first trained image quality enhancement model is trained on a first set of training pairs of images, each training pair of the first set of training pairs of images including a ground truth image extracted from a first training image volume reconstructed using higher-quality TOF training data, and an input image extracted from a second training image volume reconstructed from a first class of lower-quality TOF training data and not from a second class of lower-quality TOF training data; and the second trained image quality enhancement model is trained on a second set of training pairs of images, each training pair of the second set of training pairs of images including a ground truth image extracted from the first training image volume, and an input image extracted from a third training image volume reconstructed from the second class of lower-quality TOF training data and not from the first class of lower-quality TOF training data.

11. The method of claim 10, wherein the first training image volume is reconstructed using a first kernel optimized for use on the higher-quality TOF training data, the second training image volume is reconstructed using a second kernel optimized for use on the first class of lower-quality TOF training data, and the third training image volume is reconstructed using a third kernel optimized for use on the second class of lower-quality TOF training data.

12. The method of claim 1, wherein:

the at least one higher-quality 2-D image includes a plurality of higher-quality 2-D images;

the at least one lower-quality 2-D image includes a plurality of lower-quality 2-D images; and the at least one enhanced-quality 2-D image includes a plurality of enhanced-quality 2-D images.

13. A positron emission tomography (PET) system, comprising:

a processor and a non-transitory memory including instructions that when executed, cause the processor to:

during a scan of a subject using the PET system:

acquire time-of-flight (TOF) data based on Cherenkov radiation detected at detectors of the PET system including bismuth germinate (BGO) crystals;

classify the TOF data into higher-quality TOF data and lower-quality TOF data, the higher-quality TOF patient data comprising photon pairs created by annihilation events where a full amount of energy of each photon of each photon pair is deposited at a detector of the PET system, the lower-quality TOF patient data comprising photon pairs created by annihilation events where a full amount of energy of each photon of each photon pair is not deposited at any detector of the PET system;

reconstruct a first image volume using the higher-quality TOF data;

reconstruct a second image volume using the lower-quality TOF data;

input a first 2-D image extracted from the second image volume into a first trained image quality enhancement model to generate an enhanced-quality 2-D image;

merge the enhanced-quality 2-D image with a second 2-D image extracted from the first image volume to generate a merged image; and display the merged image on a display device and/or store the merged image in the non-transitory memory, wherein:

the first image volume is reconstructed using a first kernel optimized for use on the higher-quality TOF data; and the second image volume is reconstructed using a second kernel optimized for use on the lower-quality TOF data.

14. The PET system of claim 13, wherein:

the lower-quality TOF data includes a first class of lower-quality TOF data and a second class of lower-quality TOF data, the second class of lower quality than the first class, the first class of lower-quality TOF patient data comprising a first plurality of first class photon pairs, each first class photon pair created by an annihilation event where a full amount of energy of a first photon of the first class photon pair is deposited at a first detector of the PET system, and a partial amount of energy of a second photon of the first class photon pair is deposited at a second detector of the PET system, the second class of lower-quality TOF patient data comprising a second plurality of second class photon pairs, each second class photon pair created by an annihilation event where a partial amount of energy of a first photon of the second class photon pair is deposited at a third detector of the PET system, and a partial amount of energy a second photon of the second class photon pair is deposited at a fourth detector of the PET system;

the second image volume is reconstructed from the first class of lower-quality TOF data;

a third image volume is reconstructed from the second class of lower-quality TOF data; and further instructions are stored in the non-transitory memory that when executed, cause the processor to:

input a third 2-D image extracted from the third image volume into a second trained image quality enhancement model to generate a second enhanced-quality 2-D image; and merge the enhanced-quality 2-D image with both of the second enhanced-quality 2-D image and the second 2-D image extracted from the first image volume to generate the merged image.

15. The PET system of claim 14, wherein further instructions are stored in the non-transitory memory that when executed, cause the processor to:

store the merged image in the non-transitory memory of the PET system; and replace a slice of an image volume being displayed on the display device with the stored, merged image.

16. The PET system of claim 15, further comprising a first set of PET and/or PET-CT cameras, the first set of PET and/or PET-CT cameras including Cherenkov luminescence-based TOF PET cameras and/or true TOF capability cameras.

17. The PET system of claim 16, wherein the first trained image quality enhancement model and the second trained image quality enhancement model are trained at an AI center external to the PET system, based on lower-quality TOF training data and higher-quality TOF training data acquired via a second set of PET and/or PET-CT cameras, the second set of PET and/or PET-CT cameras including Cherenkov luminescence-based TOF-PET cameras and/or true TOF capability cameras.

18. A method for a positron emission tomography (PET) system, the method comprising:

performing a scan on a subject using the PET system to acquire a set of data of the subject;

from the set of data, reconstructing a first image volume using a first kernel, a second image volume using a second kernel, and a third image volume using a third kernel;

extracting a first plurality of 2-D images from the first image volume, a second plurality of 2-D images from the second image volume, and a third plurality of 2-D images from the third image volume;

inputting the second plurality of 2-D images into a first trained image quality enhancement model to generate a first respective plurality of enhanced-quality 2-D images;

inputting the third plurality of 2-D images into a second trained image quality enhancement model to generate a second respective plurality of enhanced-quality 2-D images;

merging each image of the first plurality of 2-D images with a corresponding image of the first respective plurality of enhanced-quality 2-D images, and a corresponding image of the second respective plurality of enhanced-quality 2-D images, to create a merged set of images;

generating an enhanced 3-D image volume from the merged set of images; and displaying the enhanced 3-D image volume on a display device.

19. The method of claim 18, further comprising:

storing the merged set of images in a memory of the PET system; and in response to a user of the PET system selecting a slice of an image volume of the subject displayed on the display device, retrieving an image of the stored, merged images corresponding to the slice and displaying the retrieved image on the display device.

* * * * *